United States Patent
Hanada et al.

(10) Patent No.: US 8,391,888 B2
(45) Date of Patent: Mar. 5, 2013

(54) PORTABLE MOBILE TERMINAL AND COMPUTER READABLE MEDIUM

(75) Inventors: Yuichi Hanada, Kawasaki (JP); Shinichiro Mori, Kawasaki (JP); Hitoshi Yanami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 76 days.

(21) Appl. No.: 13/016,080

(22) Filed: Jan. 28, 2011

(65) Prior Publication Data

US 2011/0237275 A1 Sep. 29, 2011

(30) Foreign Application Priority Data

Mar. 29, 2010 (JP) ................................ 2010-076052

(51) Int. Cl.
*H04W 24/00* (2009.01)
(52) U.S. Cl. ...................... 455/456.1; 701/416; 701/428
(58) Field of Classification Search ............... 455/456.1, 455/414.1; 701/428; 375/141
See application file for complete search history.

(56) References Cited

U.S. PATENT DOCUMENTS

| | | | |
|---|---|---|---|
| 6,009,375 A | 12/1999 | Sakamoto et al. | |
| 6,925,378 B2* | 8/2005 | Tzamaloukas | 701/428 |
| 2008/0270024 A1 | 10/2008 | Huang et al. | |
| 2009/0098880 A1 | 4/2009 | Lindquist | |
| 2011/0178759 A1* | 7/2011 | Uchida | 702/141 |
| 2011/0235686 A1* | 9/2011 | Kojima et al. | 375/141 |

FOREIGN PATENT DOCUMENTS

| | | |
|---|---|---|
| CN | 101299064 | 11/2008 |
| CN | 101446630 | 6/2009 |
| JP | 2002-277528 | 9/2002 |
| JP | 2009-92506 | 4/2009 |
| JP | 2009-115514 | 5/2009 |
| WO | WO 2008/054191 | 5/2008 |
| WO | 2009/060775 | 5/2009 |

OTHER PUBLICATIONS

European Search Report dated Jun. 27, 2011 for corresponding European Patent Application No. 11154894.7.
Chinese Office Action issued Oct. 22, 2012 in corresponding Chinese Patent Application No. 201110046892.5.

* cited by examiner

*Primary Examiner* — Charles Shedrick
(74) *Attorney, Agent, or Firm* — Staas & Halsey LLP

(57) ABSTRACT

A portable mobile terminal includes: a detection control unit; and a movement trajectory calculation unit configured to calculate a movement trajectory of a terminal body based on a detection result of an absolute position of the terminal body by the absolute position detecting unit and an acquisition result of a line segment indicating a rectilinear distance of the terminal body by a link information generation unit. The detection control unit determines a timing that comes every given time as a tentative detection timing, and in a case where the link information generation unit has not acquired a new line segment till the tentative detection timing after a previous detection timing, the detection control unit determines a timing at which the link information generation unit acquires a new line segment next as a detection timing, and starts up the absolute position detecting unit.

13 Claims, 23 Drawing Sheets

LINK DATABASE

| LINK No. | NUM- BER OF STEPS IN TURNING | LINK LENGTH | LINK AN- GLE | LINK STAR- TING POINT (x) | LINK STAR- TING POINT (y) | LINK ENDING POINT (x) | LINK ENDING POINT (y) |
|---|---|---|---|---|---|---|---|
| 1 | 235 | 164.5 | ... | ... | ... | ... | ... |
| 2 | 367 | 92.4 | ... | ... | ... | ... | ... |
| 3 | 517 | 105 | ... | ... | ... | ... | ... |
| 4 | 600 | 58.1 | ... | ... | ... | ... | ... |
| 5 | 771 | 119.7 | ... | ... | ... | ... | ... |
| 6 | 928 | 109.9 | ... | ... | ... | ... | ... |
| 7 | 1031 | 72.1 | ... | ... | ... | ... | ... |
| 8 | 1102 | 49.7 | ... | ... | ... | ... | ... |
| 9 | 1325 | 156.1 | ... | ... | ... | ... | ... |
| 10 | 1420 | 66.5 | ... | ... | ... | ... | ... |

FIG. 9

GPS DATABASE

| LINK No. | LATITUDE | LONGITUDE | NUMBER OF STEPS AT GPS ACQUISITION TIMING | FLAG |
|---|---|---|---|---|
| 1 | 35.5821007 | 139.641541 | 0 | |
| 1 | 35.5785682 | 139.641579 | 51 | 1 |
| 2 | 35.5783266 | 139.640620 | 285 | |
| 3 | 35.5727118 | 139.639777 | 480 | |
| 5 | 35.5727519 | 139.637491 | 700 | 1 |
| 6 | 35.5716759 | 139.637126 | 821 | |
| 9 | 35.5716375 | 139.636022 | 1152 | |
| 9 | 35.5716375 | 139.635928 | 1205 | |
| 10 | 35.5716375 | 139.635386 | 1420 | |

FIG. 16

| PATTERN No. | DEFAULT VALUE OF a | DEFAULT VALUE OF ß | DEFAULT VALUE OF ? | DEFAULT VALUE OF d |
|---|---|---|---|---|
| 1 | RANDOM | | | |
| 2 | 0° | 45° | 90° | |
| 3 | 0° | 90° | 180° | |
| 4 | 0° (FIRST CALCULATION) ↓ 12° (AFTER OPTIMIZATION) | 90° (FIRST CALCULATION) ↓ 89° (AFTER OPTIMIZATION) ↓ 89° (SECOND CALCULATION) | 180° (FIRST CALCULATION) ↓ 178° (AFTER OPTIMIZATION) ↓ 178° (SECOND CALCULATION) | 268° (SECOND CALCULATION) |

SUM OF SQUARES OF
DISTANCES = 421.2

SUM OF SQUARES OF
DISTANCES = 243.8

SUM OF SQUARES OF
DISTANCES = 93.15

SUM OF SQUARES OF
DISTANCES = 92.69

SUM OF SQUARES OF
DISTANCES = 92.68

RELIABILITY: LOW
SET k SMALL

RELIABILITY: HIGH
SET k LARGE

DISTANCE : SHORT
SET k LARGE

DISTANCE : LONG
SET k SMALL

DISTANCE FROM STARTING
POINT : SHORT

SET k LARGE

DISTANCE FROM STARTING
POINT : LONG

SET k SMALL

PORTABLE MOBILE TERMINAL AND COMPUTER READABLE MEDIUM

CROSS-REFERENCE TO RELATED APPLICATION

This application is based upon and claims the benefit of priority of the prior Japanese Patent Application No. 2010-076052, filed on Mar. 29, 2010, the entire contents of which are incorporated herein by reference.

FIELD

A certain aspect of the embodiments discussed herein is related to a portable mobile terminal and a computer readable medium.

BACKGROUND

Recently, navigation systems combining GPS (Global Positioning System) and the autonomous navigation become widely used. In recent days, portable mobile terminals such as mobile phones, to which the navigation system is mounted, appear.

Japanese Patent Application Publication No. 2009-115514 (Document 1) discloses an art of which the object is to solve the problem in a capability of following an output position of GPS when turning to the right or the left with keeping continuity or straightness of a trajectory of the output position of GPS while traveling in a straight line. In this art, GPS positioning is carried out intermittently and a turn in the traveling direction is detected with a gyro sensor. In addition, the output position of GPS is determined with a polytomous regression estimation process while traveling in a straight line, and the output position of GPS is determined with a binary smoothing process when turning to the right or the left.

Japanese Patent Application Publication No. 2009-92506 (Document 2) discloses an art of which the object is to determine a positioning timing at a necessary position automatically depending on the situation with saving a power in the mobile terminal device carried by a walking user. In this art, as GPS positioning is carried out at the start of the navigation, the number of steps till the next positioning timing is calculated based on a distance or a route from the current measured position to the destination. Then, when a pedometer counts the calculated number of steps, next GPS positioning is carried out, and the number of steps till the next positioning timing is calculated on the basis of the calculated current position. In this case, the number of steps till the next positioning timing is set to smaller value as the number of steps to the position where the user changes the path in the route from the measured current position to the destination or the distance from the measured current position to the destination becomes shorter.

In this kind of navigation system, the reduction of power consumption of sensors, which carry out various measurements, is studied to achieve an autonomous positioning for many hours.

SUMMARY

According to an aspect of the present invention, there is provided a portable mobile terminal including: a terminal body; an absolute position detecting unit configured to detect an absolute position of the terminal body; a detection control unit configured to determine a detection timing by the absolute position detecting unit and start up the absolute position detecting unit; a link information generation unit configured to acquire a line segment indicating a rectilinear distance from when the terminal body starts traveling to a certain direction till when the terminal body changes its traveling direction; and a movement trajectory calculation unit configured to calculate a movement trajectory of the terminal body based on a detection result of the absolute position detecting unit and an acquisition result of the link information generation unit, wherein the detection control unit determines a timing that comes every given time as a tentative detection timing, and in a case where the link information generation unit has not acquired a new line segment till the tentative detection timing after a previous detection timing, the detection control unit determines a timing at which the link information generation unit acquires a new line segment next as a detection timing, and starts up the absolute position detecting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating a GPS database;

FIG. 16 is a diagram illustrating a method of setting a default value;

DESCRIPTION OF EMBODIMENTS

As described previously, in navigation systems according to related arts, the reduction of power consumption of sensors, which carry out various measurements, is studied to achieve an autonomous positioning for many hours.

Generally, the power consumption of GPS is large compared to the sensors in the terminal such as geomagnetism sensors. In contrast, when sensors in the terminal are used, it is basically possible to measure a position regardless of the location, but the error may become large in an autonomous positioning using only measured values of sensors in the terminal because the possibility that the measuring error of sensors is accumulated cumulatively is high. From this point of view, to reduce power consumption, it may be effective to reduce the number of GPS positioning by correcting the measuring result acquired by sensors in the terminal with the result of GPS positioning acquired intermittently. Moreover, it is desirable to keep the accuracy of the autonomous positioning an appropriate accuracy even if the number of GPS positioning is reduced.

However, in Document 1, it is not considered to reduce the number of GPS measurements. In addition, in Document 2, it is not possible to reduce the number of GPS measurements if a route is not preliminarily given.

Figure 1:
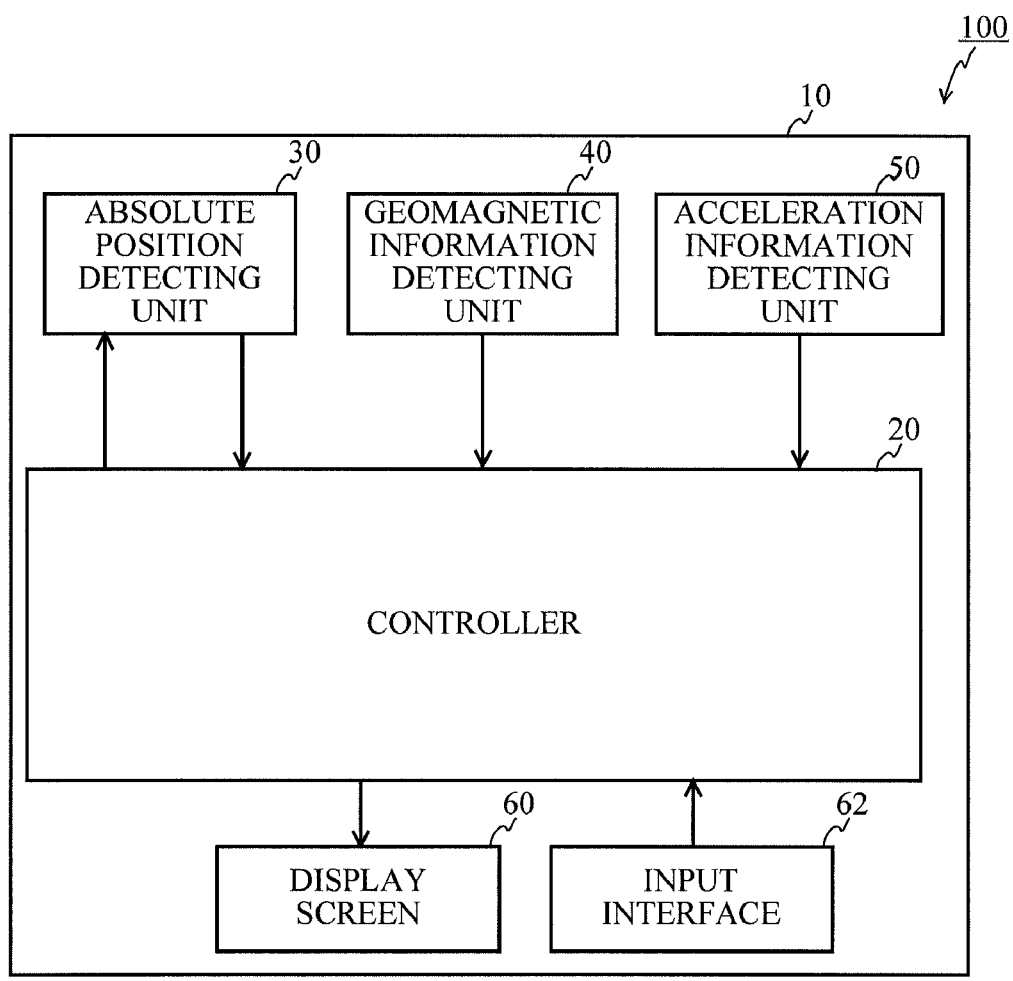
FIG. 1 is a diagram illustrating a configuration of a portable mobile terminal in accordance with an exemplary embodiment schematically.

A description will now be given of embodiments of a portable mobile terminal with reference to FIG. 1 through FIG. 21B. In FIG. 1, a portable mobile terminal 100 is illustrated with a block diagram. In this embodiment, the portable mobile terminal 100 is a portable terminal such as a mobile phone, a PHS (Personal Handy-phone System), a smartphone and a PDA (Personal Digital Assistant) for example.

As illustrated in FIG. 1, the portable mobile terminal 100 is provided with an absolute position detecting unit 30, a geomagnetic information detecting unit 40, an acceleration information detecting unit 50, a display screen 60, an input interface 62, and a controller 20. These units are mounted in the inside of a terminal body 10. The portable mobile terminal 100 may be provided with several functions such as a verbal communication function, a communication function including an e-mail and the internet, and a photographing function, but components to achieve these functions are not illustrated in FIG. 1.

In this embodiment, the absolute position detecting unit 30 is a GPS receiver, receives signals from GPS satellites located above the earth, and acquires information relating to an absolute position designated by the latitude and longitude.

The geomagnetic information detecting unit 40 is also called an orientation sensor, and is a geomagnetism sensor capable of detecting the geomagnetism on the triaxial coordinate system, which means a geomagnetic orientation sensor. Instead of a geomagnetism sensor, a gyro sensor (an angular velocity sensor) may be used. The acceleration information detecting unit 50 is a sensor that detects an acceleration in a triaxial direction.

The display screen 60 displays various information according to instructions from the controller 20. For example, the display screen 60 displays information of the route where a user carrying the portable mobile terminal 100 traveled. The input interface 62 includes a keyboard, a touch panel and the like.

Figure 2:
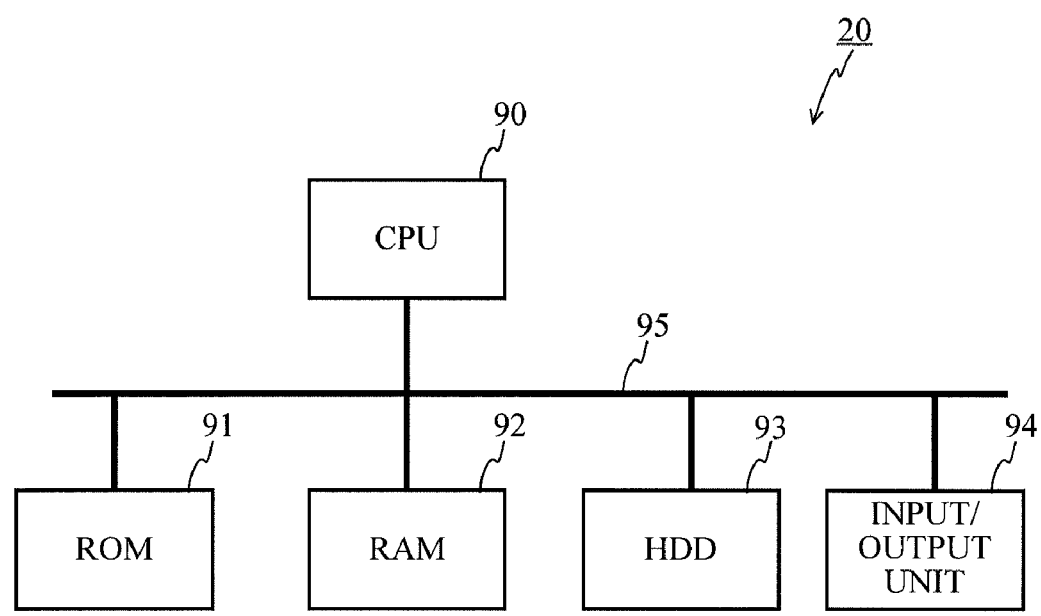
FIG. 2 illustrates a hardware structure diagram of the portable mobile terminal.
Figure 3:
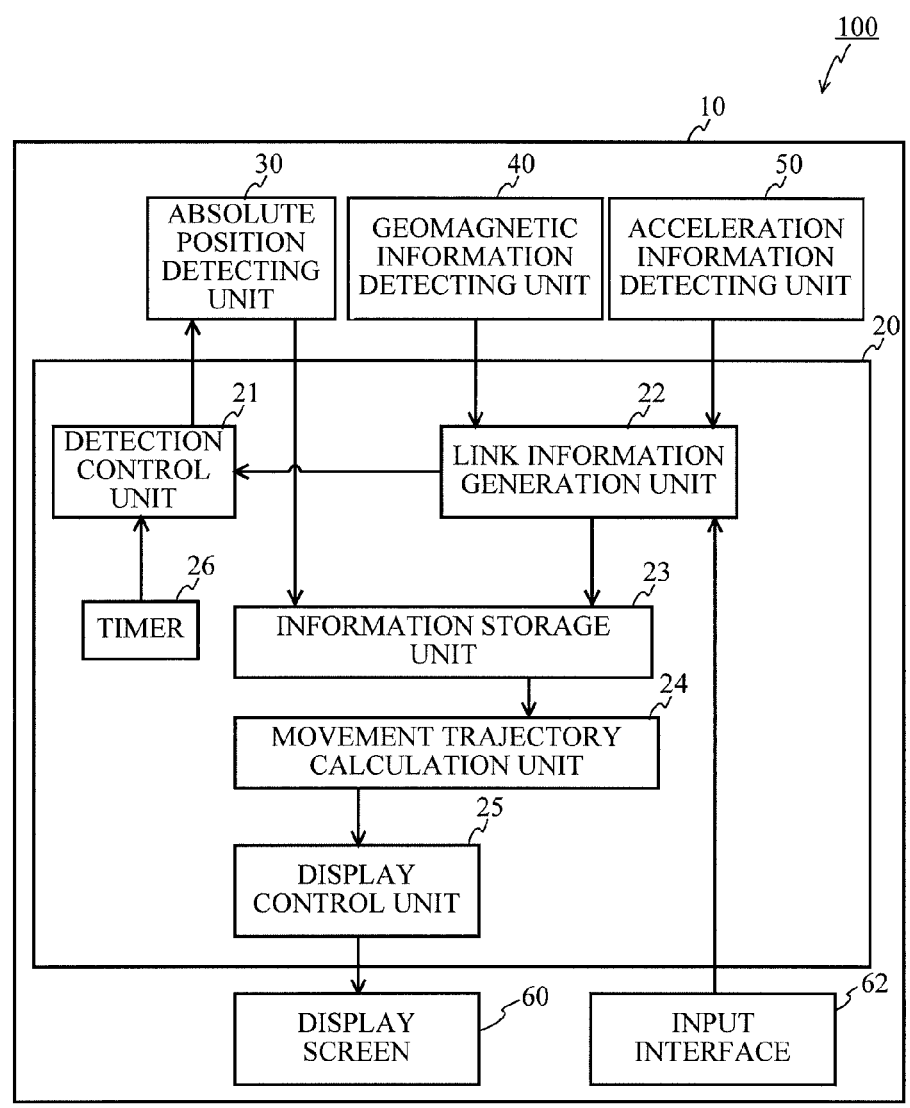
FIG. 3 is a functional block diagram of a controller in FIG. 1.

In FIG. 2, a hardware structure of the controller 20 is illustrated. As illustrated in FIG. 2, the controller 20 is provided with a CPU (Central Processing Unit) 90, a ROM (Read Only Memory) 91, a RAM (Random Access Memory) 92, a storage unit (here, an HDD (Hard Disk Drive)) 93, an input/output unit 94 and the like. Components of the controller 20 are coupled to each other via a bus 95. In the controller 20, as the CPU 90 executes a movement trajectory calculation program stored in the RAM 92 or the HDD 93, functions of processing units illustrated in FIG. 3 are achieved. In addition, the HDD 93 stores data acquired in the controller 20 and the like, and functions as an information storage unit 23 in FIG. 3. The input/output unit 94 is an input/output port communicating with the display screen 60 and the input interface 62.

FIG. 3 illustrates a functional block diagram of the controller 20 in FIG. 1. As illustrated in FIG. 3, the controller 20 includes a detection control unit 21, a link information generation unit 22, the information storage unit 23, a movement trajectory calculation unit 24, a display control unit 25, a timer 26 and the like.

The detection control unit 21 determines a start-up timing, in other words a detection timing, of the absolute position detecting unit 30 based on information from the link information generation unit 22 and the timer 26, and makes the absolute position detecting unit 30 execute an absolute position measurement at the detection timing.

The link information generation unit 22 generates information of a line segment (referred to as a "link information") including information of the distance while the terminal body 10 is traveling in a straight line based on detection results of the geomagnetic information detecting unit 40 and the acceleration information detecting unit 50. The link information generation unit 22 starts the generation of the link information from when a user carrying the portable mobile terminal 100 starts walking, and stops the generation of the link information when it receives a command representing an end of walking which is input from the user through the input interface 62. The link information generation unit 22 outputs an instruction for terminating a detection by the absolute position detecting unit 30 to the detection control unit 21 when receiving a command to end a GPS application which is input from the input interface 62.

The information storage unit 23 stores the link information generated in the link information generation unit 22 and a GPS measurement result detected in the absolute position detecting unit 30 in a database. The movement trajectory calculation unit 24 reads the link information and the GPS measurement result from the information storage unit 23, calculates and acquires the movement trajectory of the terminal body 10. The detail of the database stored in the information storage unit 23 will be described later.

The display control unit 25 acquires a movement trajectory acquired in the movement trajectory calculation unit 24, and displays it on the display screen 60. The timer 26 includes a real-time clock for example, and notifies the detection control unit 21 of the advent of a tentative detection timing described later at specified time intervals (e.g. at three-minute intervals).

Figure 4:
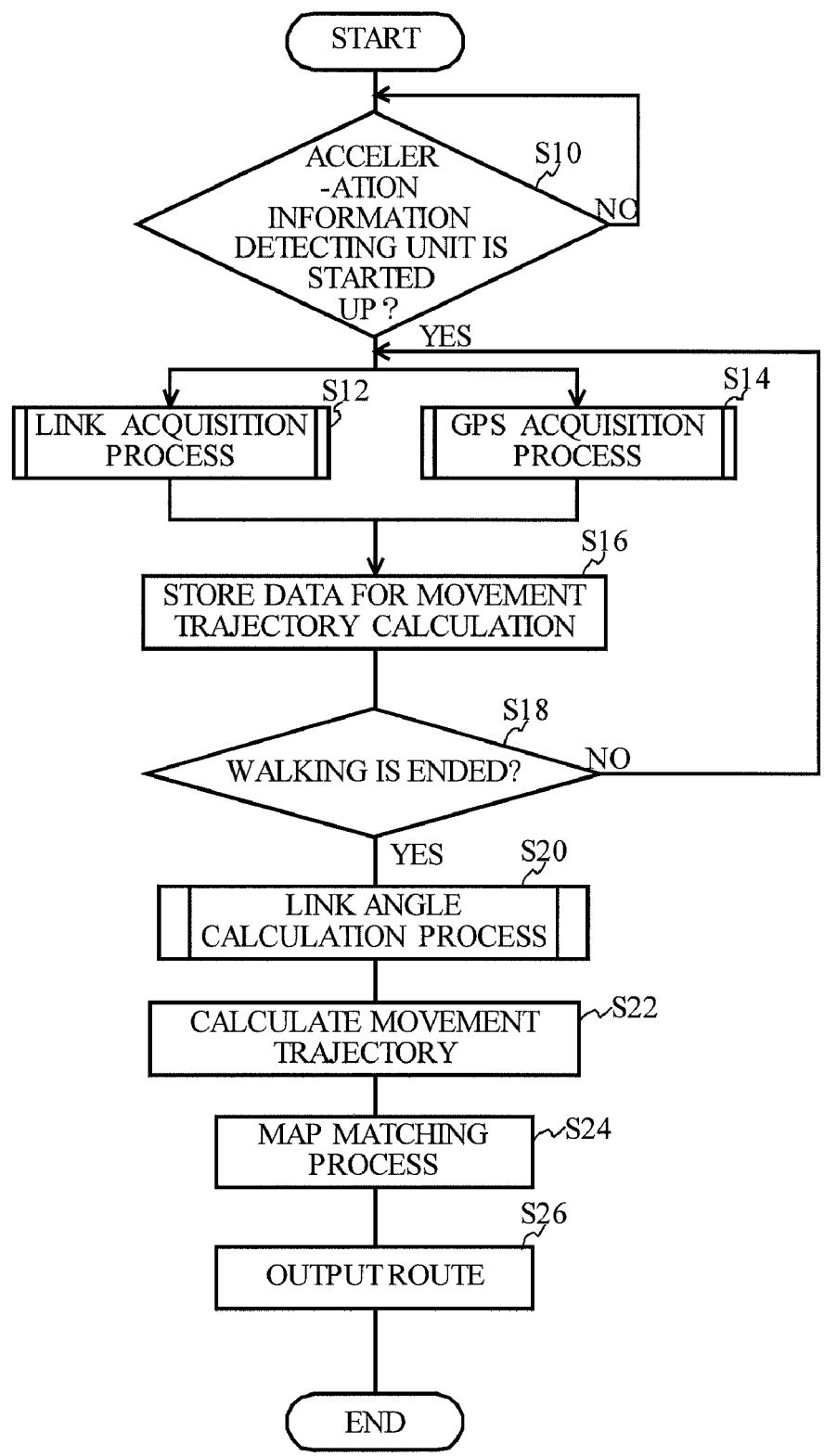
FIG. 4 is a flowchart illustrating an overall flow of a process executed in the portable mobile device.

A detail description will now be given, with reference to FIG. 4 through FIG. 21B, of a process in the portable mobile terminal 100 configured as described above. FIG. 4 is a flowchart illustrating an overall flow of a process executed in the portable mobile terminal 100.

In the process of FIG. 4, the link information generation unit 22 determines whether the acceleration information detecting unit 50 is started up in a step S10. When the determination of the step S10 is YES, the process moves to a step S12 and a step S14. Steps S12 and S14 are simultaneously executed in parallel. A link acquisition process is executed in the step S12, and a GPS acquisition process is executed in the step S14. Now, the link acquisition process (the step S12) and the GPS acquisition process (the step S14) will be described more specifically.

(A) Link Acquisition Process (Step S12)

Figures 5A, 5B:
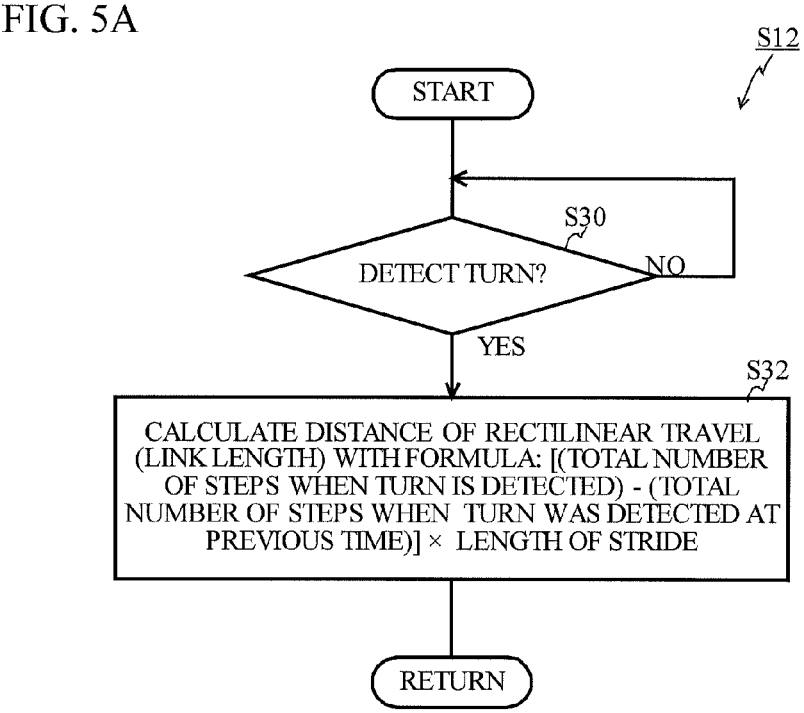
FIG. 5A is a diagram illustrating a subroutine of a link acquisition process of a step S12.
FIG. 5B is a diagram illustrating a link database.

A subroutine of the link acquisition process of the step S12 is executed according to a flowchart illustrated in FIG. 5A. More specifically, the link information generation unit 22 determines whether it detects a turn in a step S30. Here, the turn means a change of traveling direction of the user carrying the portable mobile terminal 100. The link information generation unit 22 detects a turn when a magnitude of the geomagnetic change detected in the geomagnetic information detecting unit 40 is equal to or larger than a given value for example.

When the determination of the step S30 is YES, the process moves to a step S32, and the link information generation unit 22 calculates the distance of rectilinear travel (link length) according to the following formula (1).

link length=[(the total number of steps when the turn is detected)−(the total number of steps when the turn was detected at previous time)]×the length of stride    (1)

The number of steps is acquired from the change of the acceleration detected by the acceleration information detecting unit 50. The length of stride is set by a user. Instead of the length of stride, a user may input a body height, and in this case the link information generation unit 22 calculates an approximate length of stride from the input body height.

After the step S12, the process moves to a step S16 in FIG. 4, and the link information generation unit 22 registers the link length calculated based on the above formula (1) in a link database stored in the information storage unit 23 (see FIG. 5B) as data for a movement trajectory calculation. Here, as illustrated in FIG. 5B, the link database includes "link No.", "number of steps in turning", "link length", "link angle", "link starting point (x)", "link starting point (y)", "link ending point (x)" and "link ending point (y)". "Link No." represents a serial number of a link, "number of steps in turning" represents the total number of steps of a user when the turn is detected. "Link angle" represents an angle (counterclockwise angle) based on an given direction (e.g. east). "Link starting point (x)" and "link starting point (y)" represent a coordinate of the starting point of the link, and "link ending point (x)" and "link ending point (y)" represent a coordinate of the ending point of the link. At the stage of the step S16, "link starting point (x)", "link starting point (y)", "link ending point (x)" and "link ending point (y)" remain blank.

In a step S18, the link information generation unit 22 determines whether the walking is ended. When the determination of the step S18 is YES, the process goes back to the step S12. For example, when the acceleration information detecting unit 50 does not detect the walking of the user for given time or the user inputs a command representing an end of walking from the input interface 62, the determination of the step S18 may become YES.

Then information of a line segment including the link length acquired by the process of the step S12 will be called a link or a link information. The link information includes information about the length between the starting point and the ending point, but does not include a direction from the starting point to the ending point (the angle to east). The link No. is added to each link in order of timing at which the link is acquired.

Hereinafter, the link where the terminal is traveling currently is called "current link". When the terminal is traveling along the current link in a straight line, information of the current link is not acquired by the link information generation unit 22, and is generated when the next turn is detected. The link which was generated just before the current link, which means the link generated when the last turn was detected, is called "one previous link" (e.g. see FIG. 11A). The link which was generated just before the one previous link is called "two previous link" (e.g. see FIG. 11A). The duration of travel of the mobile terminal along the one previous link is a first duration, and the duration of travel of the mobile terminal along the two previous link is a second duration.

(B) GPS Acquisition Process (Step S14)

Figure 6A:
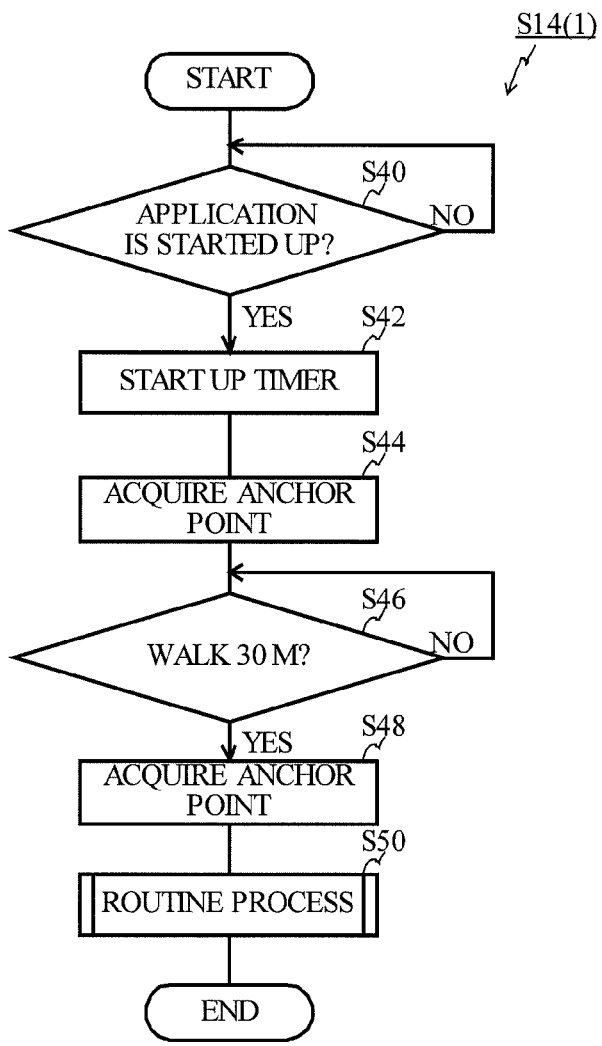
FIGS. 6A and 6B are diagrams illustrating subroutines of a GPS acquisition process of a step S14.
Figure 6B:
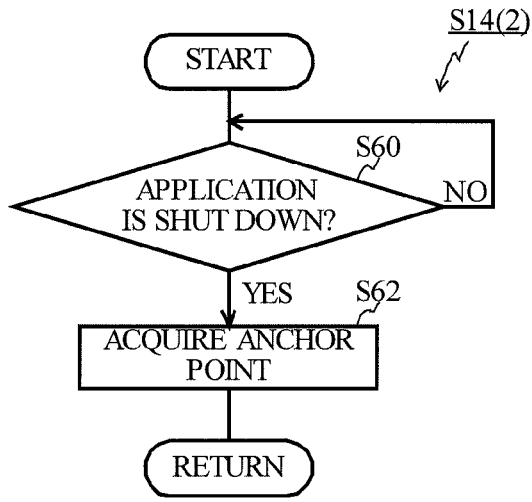

A description will now be given of a subroutine of a GPS acquisition process of the step S14 which is executed simultaneously in parallel to the link acquisition process described above. A description will be given of a subroutine of the GPS acquisition process of the step S14 according to the flowcharts illustrated in FIG. 6A and FIG. 6B. A process in FIG. 6A and a process in FIG. 6B are executed simultaneously in parallel. Hereinafter, the process in FIG. 6A is described as "step S14 (1)", and the process in FIG. 6B is described as "step S14 (2)".

In the step S14 (1) in FIG. 6A, the detection control unit 21 determines whether an application for GPS measurement (hereinafter, referred to as a "GPS application") is started up by the user in a step S40. The user inputs a command to start up the GPS application from the input interface 62. When the determination of the step S40 is YES, the detection control unit 21 goes to a step S42.

In the step S42, the timer 26 is started up according to the instruction of the detection control unit 21. Then, in a step S44, the detection control unit 21 carries out a GPS measurement via the absolute position detecting unit 30. In the GPS measurement, an absolute position (latitude and longitude) of the portable mobile terminal 100 (the terminal body 10) is detected. Hereinafter, the GPS measurement (acquisition) carried out in parallel to the link acquisition process of the step S12 is also called an "anchor point acquisition". Moreover, the position information of the anchor point is simply called an "anchor point".

In procedures of steps S40 through S44, the anchor point (the position information of the anchor point) is acquired just after the GPS application is started up.

In the step S46, the detection control unit 21 determines whether the user walked 30 m. Here, the detection control unit 21 determines whether the user walked 30 m based on a value calculated from a product of the number of steps detected by the acceleration information detecting unit 50 and the length of stride. However, the method of determining whether the user walked 30 m is not limited thereto, and the detection control unit 21 may determine whether the user walked 30 m based on whether the time that the user generally needs for walking 30 m (e.g. 23 seconds) passed. The time needed for walking 30 m may be set preliminarily, or may be automatically set by the detection control unit 21 based on data about the number of steps acquired in past times. When the determination of the step S46 is YES, the process goes to a step S48.

Figure 7A:
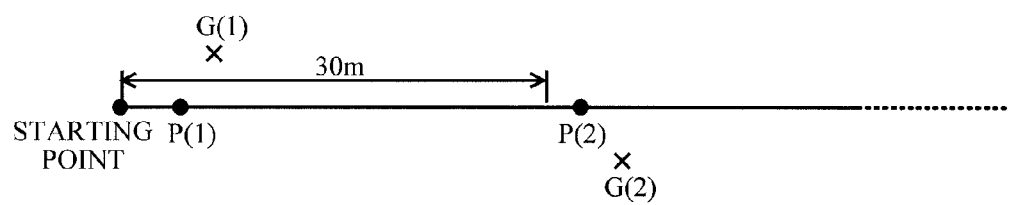
FIG. 7A is a diagram illustrating an anchor point acquisition state after procedures of steps S40 through S48.

In the step S48, the detection control unit 21 acquires an anchor point again. Accordingly, as illustrated in FIG. 7A, two anchor points are acquired after the start of walking from the position where the GPS application is started up (starting point) through procedures of steps S40 to S48. In FIG. 7A, an anchor point is indicated with "G(n)", and a position on the link where the anchor point is acquired is indicated with "P(n)". Moreover, in FIG. 7A, the reason why the point where the user walked 30 m from the starting point is different from the position on the link where the anchor point is acquired is because the detection of the anchor point is slightly delayed from the start-up in the absolute position detecting unit 30. As described above, the reason why the detection control unit 21 acquires two anchor points after the start of walking from the starting point is because it becomes possible to improve the accuracy of the movement trajectory calculation executed later by acquiring the direction that the user is heading in at the start of walking.

The detection control unit 21 moves to a routine process of a step S50. The process of the step S50 will be described later.

Figure 7B:
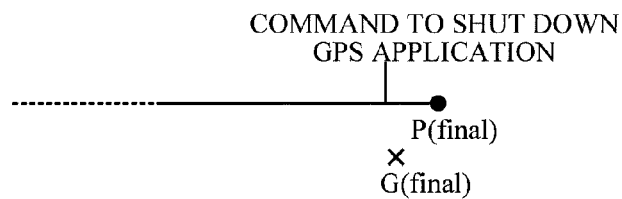
FIG. 7B is a diagram illustrating an anchor point acquisition state after a command to stop a GPS application is input.

In the step S14(2) in FIG. 6B which is executed simultaneously in parallel to the process illustrated FIG. 6A, the detection control unit 21 stands by till the GPS application is shut down by the user in a step S60. When the user inputs a command to shut down the GPS application through the input interface 62, the determination of the step S60 becomes YES, and the process moves to a step S62. In the step S62, the detection control unit 21 acquires an anchor point, and the process goes to the step S16 in FIG. 4. As illustrated in FIG. 7B, in the step S62, an anchor point G(final) is acquired just after the command to shut down the GPS application is input.

A detail description will now be given of a subroutine of the "routine process" of the step S50 in FIG. 6A with reference to FIG. 8. The process in FIG. 8 and the time counting by the timer 26 are started simultaneously. That is to say that the process in FIG. 8 stars at the same time as the start-up of the timer.

Figure 8:
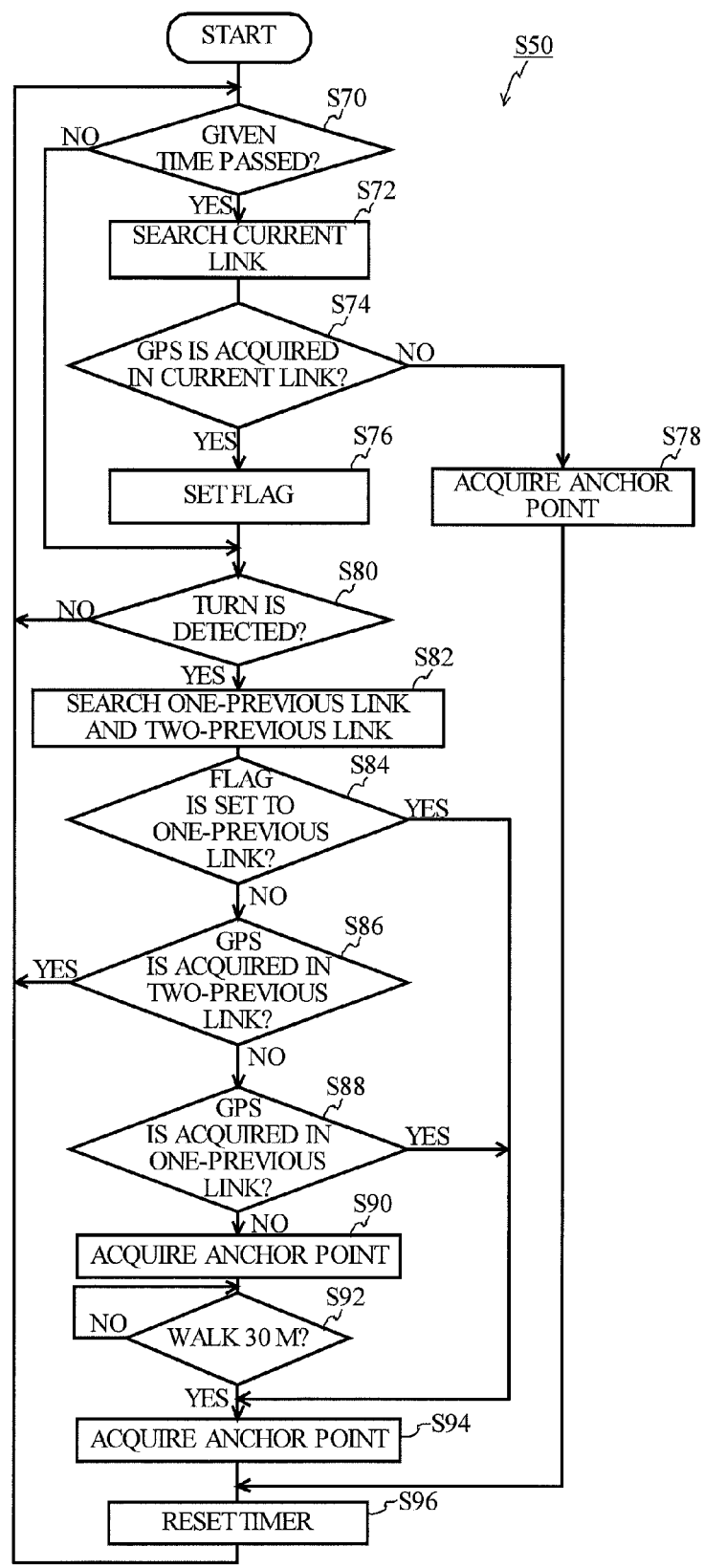
FIG. 8 is a flowchart illustrating a subroutine of a step S50 in FIG. 6A.

In FIG. 8, the detection control unit 21 checks the time of the timer 26, and determines whether a given time passed in the step S70. When the determination of the step S70 is YES, the process moves to the step S72. When the determination of the step S70 is NO, the process moves to the step S80. A given time means an interval of carrying out a GPS measurement intermittently, and is preliminarily set (e.g. 3 minutes). The timing of when the given time passes may be also called a tentative detection timing for detecting an absolute position. The tentative detection timing is a timing which becomes a real detection timing in a case where the determination of the step S74 is NO.

When the determination of the step S70 is YES and the process goes to the step S72, the detection control unit 21 searches the current link and checks whether the GPS measurement (anchor point acquisition) is already performed in the current link. In the step S72, the detection control unit 21 searches a GPS database stored in the information storage unit 23 and illustrated in FIG. 9. As illustrated in FIG. 9, the GPS database includes "link No.", "latitude", "longitude", "number of steps at GPS acquisition timing" and "flag" as items. "Link No." is a serial number of a link being acquired when the anchor point is measured. "Latitude" and "longitude" indicate a GPS measurement result. "Number of steps at GPS acquisition timing" indicates the number of steps that the user walked from the start of walking till the GPS acquisition is carried out. In FIG. 9, for example, when the serial number of the link is "10" or "9", it is indicated that the GPS measurement is carried out. When the serial number of the link is "8" or "7", it is indicated that the GPS measurement is not carried out because "8" and "7" do not exist in the "link No." of the GPS database.

In a next step S74, the detection control unit 21 determines whether the GPS measurement is already carried out in the current link based on the result of the check in the step S72. When the determination of the step S74 is NO, the process moves to the step S78, and the detection control unit 21 acquires an anchor point with the absolute position detecting unit 30. Then, the detection control unit 21 resets the timer 26 in the step S96, and goes back to the step S70.

Figure 10A:
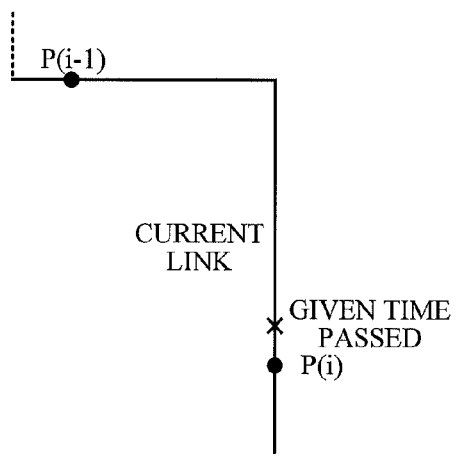
FIGS. 10A through 10C are diagrams illustrating a method of acquiring an anchor point.

More specifically, as illustrated in FIG. 10A, when the anchor point is not acquired in the current link yet, the detection control unit 21 starts up the absolute position detecting unit 30 after a given time passes, and acquires an anchor point at the position P(i). In other words, an anchor point is not acquired more than once in one link. This is because acquiring an anchor point more than once in one link does not contribute to the accuracy of movement trajectory calculation much and is because the power consumption can be reduced by reducing the number of detection by the absolute position detecting unit 30.

Figure 10B:
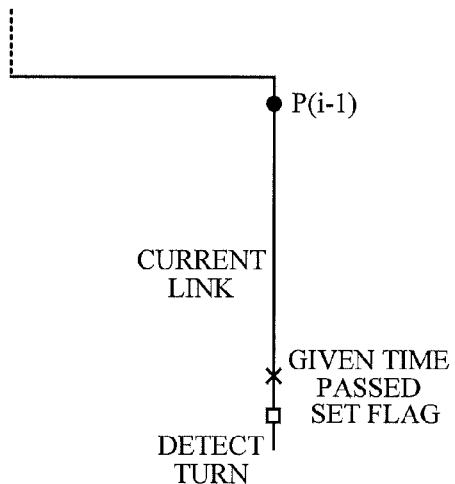

On the other hand, when the determination of the step S74 is YES, which means that the GPS is already acquired in the current link as illustrated in FIG. 10B, the process moves to the step S76. In the step S76, the detection control unit 21 sets a flag. This means that "1" is set to the item "flag" of the GPS database in FIG. 9. Then, the detection control unit 21 moves to the step S80.

In the step S80, the detection control unit 21 determines whether the turn is detected. When the determination of the step S80 is NO, the process goes back to the step S70. When the determination of the step S80 is YES, the process goes to the step S82.

In the step S82, the detection control unit 21 searches the one-previous link and the two-previous link During this search, the detection control unit 21 searches the database represented in FIG. 9A in the same manner as the step S72. This means that the detection control unit 21 searches links of which respective serial numbers are "9" and "8" when the serial number of the link being currently acquired is "10".

Figure 10C:
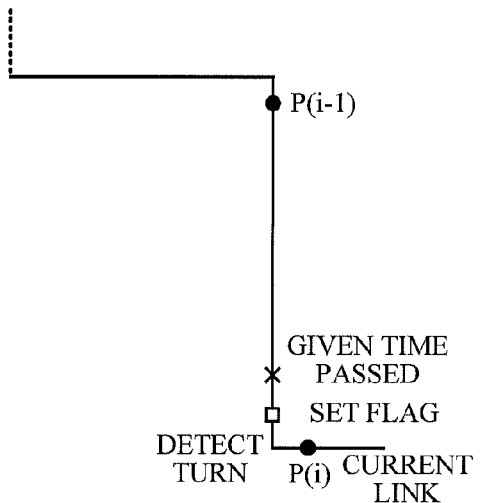

Then, in the step S84, the detection control unit 21 determines whether a flag is set to the one-previous link When the determination of the step S84 is YES, which means that the flag "1" is set to the one-previous link, the process goes to the step S94. When the process moves to the step S94, the detection control unit 21 acquires an anchor point with the absolute position detecting unit 30 in the same manner described above. Then, the detection control unit 21 resets the timer 26 in the step S96, and goes back to the step S70. In other words, as illustrated in FIG. 10C, if a turn is detected after the flag is set, an anchor point is acquired just after the detection of the turn. As described above, the reason why an anchor point is acquired just after the turn is detected is for preventing the acquisition of an absolute position more than once in the same link as described above, and is because the accuracy of the movement trajectory calculation may be decreased if an absolute position is not acquired for too long.

Figure 11A:
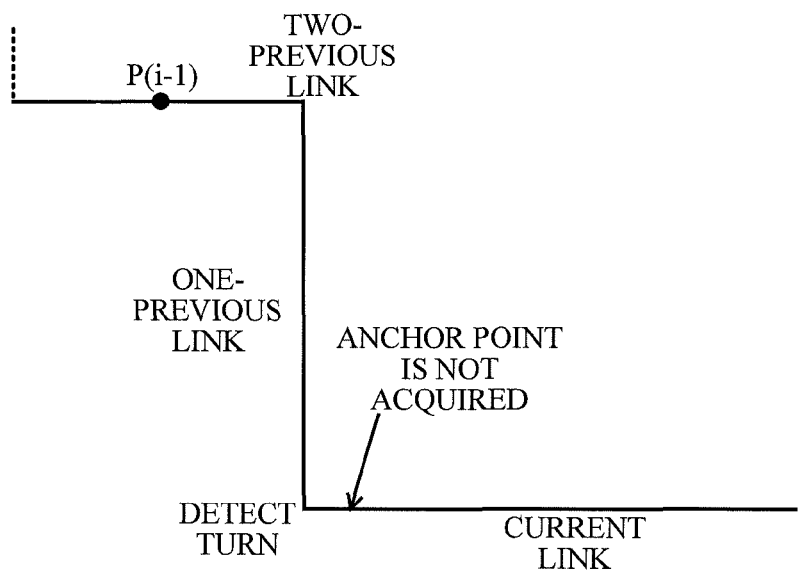
FIGS. 11A and 11B are diagrams illustrating a method of acquiring an anchor point.
Figure 11B:
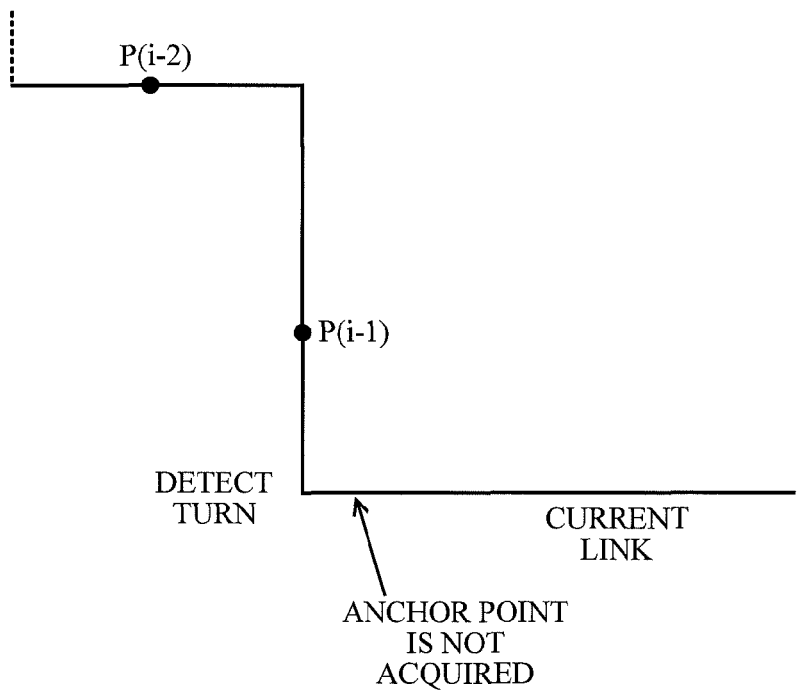

When the determination of the step S84 is NO, the detection control unit 21 determines whether the GPS was acquired in the two-previous link in the step S86. When the determination of the step S86 is YES, the process goes back to the step S70. This means that when the GPS was acquired in the two-previous link, an anchor point is not acquired after the detection of the turn this time regardless of whether the GPS was acquired in the one-previous link as illustrated in FIG. 11A and FIG. 11B. This is because the angle of the link may be determined without problems even though anchor points were not acquired in consecutive links, and is because the angle of the link may be determined without problems if the anchor point can be acquired in the next link even though anchor points were not acquired in two links. Moreover, the number of detections by the absolute position detecting unit 30 may be reduced by not acquiring an anchor point, and the power consumption may be reduced accordingly.

When the determination of the step S86 is NO, the process goes to the step S88, and the detection control unit 21 determines whether the GPS, which means an anchor point, is acquired in the one-previous link.

Figure 12A:
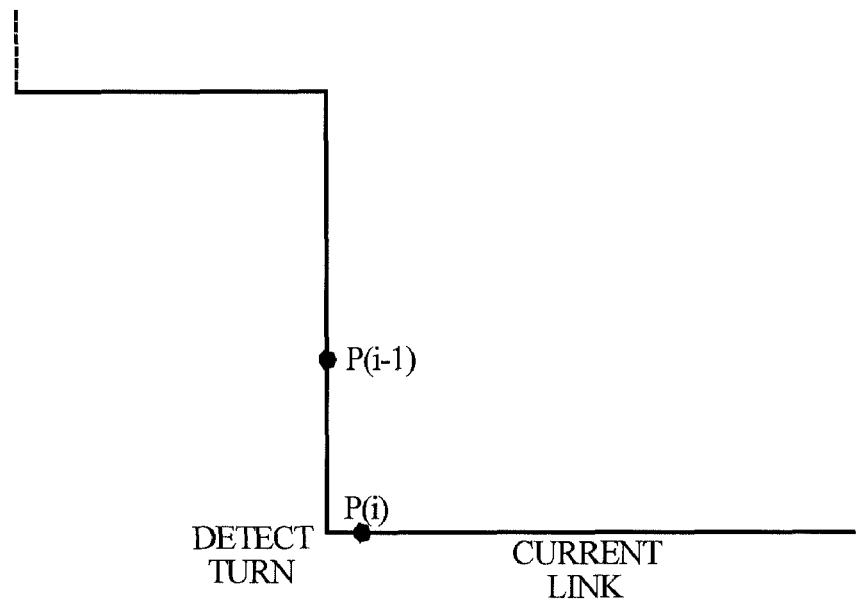
FIGS. 12A and 12B are diagrams illustrating a method of acquiring an anchor point.

When the determination of the step S88 is YES, the process moves to the step S94, and the detection control unit 21 acquires an anchor point with the absolute position detecting unit 30. Then, the detection control unit 21 resets the timer 26 in the step S96, and goes back to the step S70. In other words, as illustrated in FIG. 12A, when an anchor point was not acquired in the two-previous link and an anchor point was acquired in the one-previous link, the detection control unit 21 acquires an anchor point. The reason why the detection control unit 21 acquires an anchor point as illustrated in FIG. 12A is because the trouble (an symmetric inversion of a part of movement trajectory) may occur in the movement trajectory calculation if an anchor point is not acquired at P(i) in FIG. 12A.

Figure 12B:
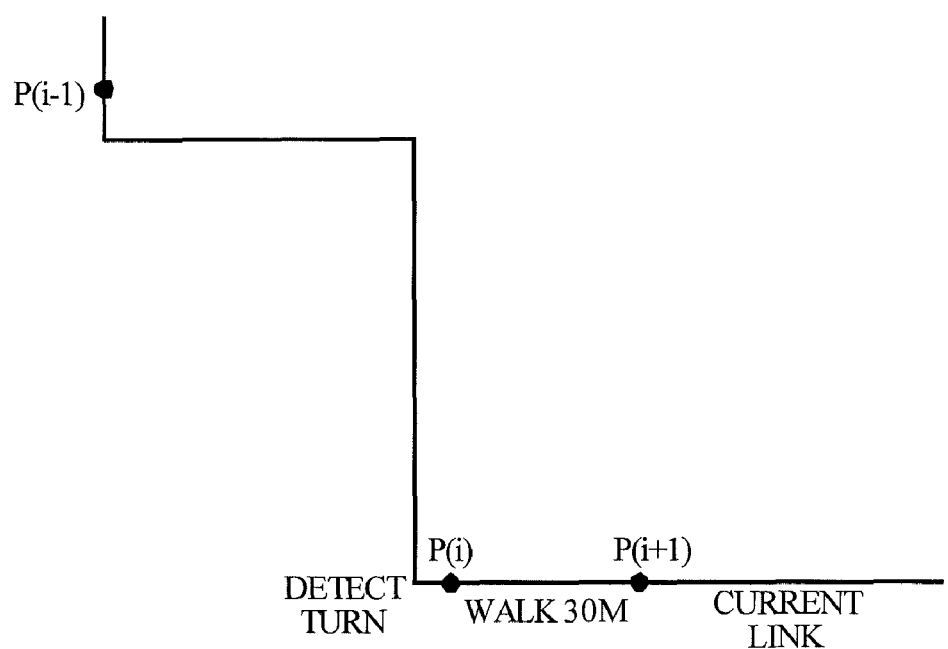

When the determination of the step S88 is NO, the process moves to the step S90. In the step S90, the detection control unit 21 acquires an anchor point with the absolute position detecting unit 30, and then stands by till it is determined that the user walked 30 m in the step S92. Then, when the detection control unit 21 determines that the user walked 30 m, the process moves to the step S94. In the step S94, the detection control unit 21 acquires an anchor point with the absolute position detecting unit 30 again. In this case, as illustrated in FIG. 12B, two anchor points are acquired at 30-meter intervals after the detection of the turn. As described above, the reason why an anchor point is acquired twice consecutively is because respective directions of the one-previous link and the two previous link are roughly determined without inversion as the direction of the current link is almost determined by these twice measurements. Then, the detection control unit 21 resets the timer 26 in the step S96, and goes back to the step S70.

Anchor points are acquired intermittently by repeating above process. The repeated process in FIG. 8 is terminated when the determination of the step S60 in FIG. 6B becomes YES.

Back to FIG. 4, in the step S16 executed after the step S14, the detection control unit 21 stores the information of anchor points (result of GPS measurement) in the GPS database of the information storage unit 23 as data for the movement trajectory calculation. Then, the process moves to the step S18, and the detection control unit 21 determines whether the walking is ended. When the determination of the step S18 is YES, the detection control unit 21 moves to the step S20. A description will now be given of specific procedures of the process of the step S20 with reference to flowcharts illustrated in FIG. 13 and FIG. 15.

(C) Link Angle Calculation Process (Step S20)

Figure 13:
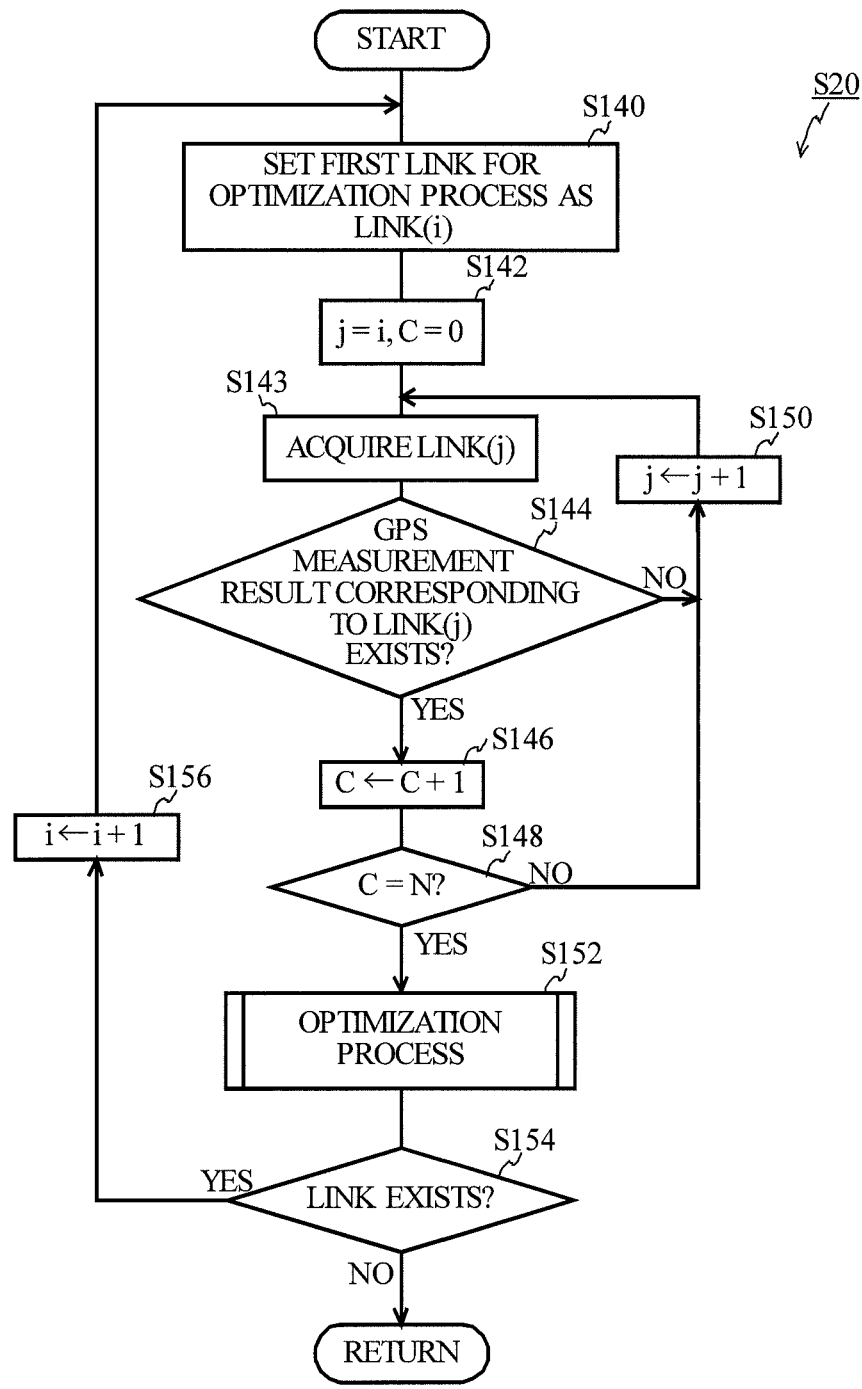
FIG. 13 is a flowchart illustrating a subroutine of a step S20.
Figure 15:
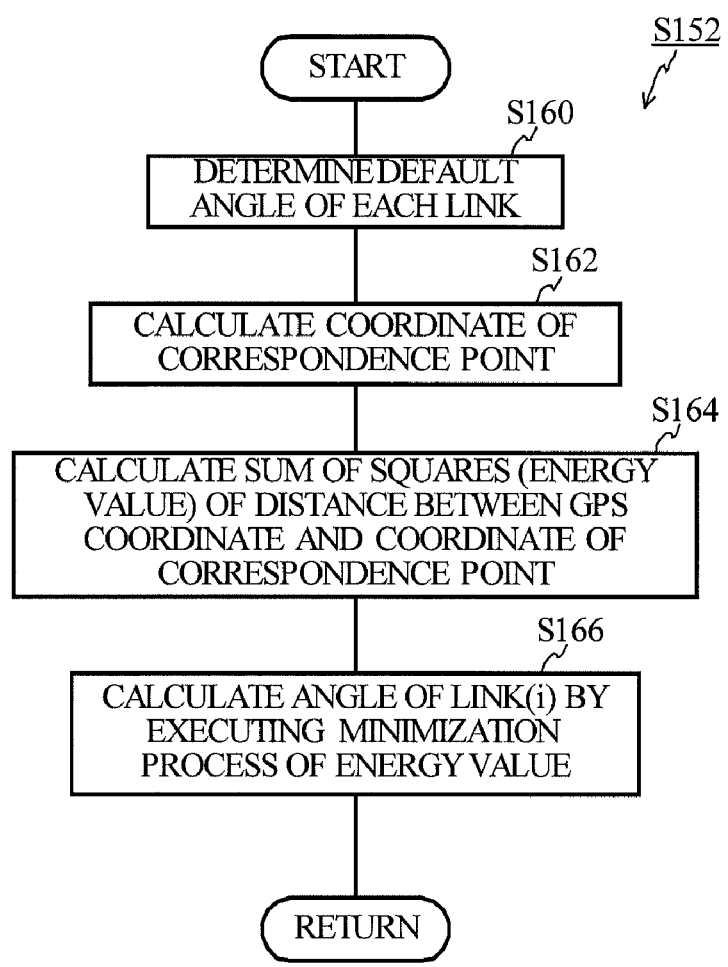
FIG. 15 is a diagram illustrating a subroutine of a step S152.

FIG. 13 is a flowchart illustrating an overall flow of the process of the step S20. FIG. 15 is a flowchart illustrating the contents of the process of the step S152 in FIG. 13 specifically.

Figure 14:
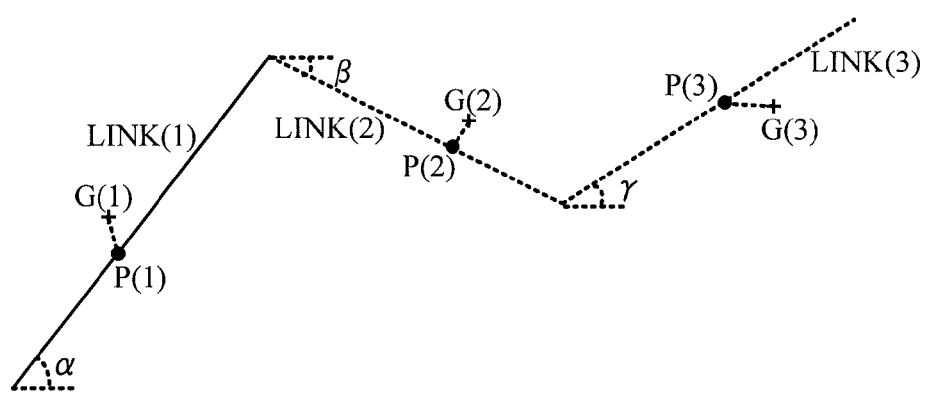
FIG. 14 is a diagram illustrating an optimization process.

In the process in FIG. 13, the movement trajectory calculation unit 24 sets a first link for an optimization process as link(i) in the step S140. Here, the optimization process is a process of calculating the optimum value of the angle (a) of the link which was acquired first among three links by using consecutive three links (assume that an anchor point was acquired in each link) and anchor points for example as illustrated in FIG. 14. In a practical sense, more than three links including at least three links having respective correspondent anchor points are used, but for convenience sake, a description will be given of a case where only three links are used because an anchor point is acquired once in each link. Here, assume that i is equal to 1 (i=1).

Back to FIG. 13, in the next step S142, the movement trajectory calculation unit 24 sets the parameter j to the same value of i, and sets the parameter C to 0. The parameter j indicates the number of the link used for the optimization process, and the parameter C indicates the number of anchor points. Here, the movement trajectory calculation unit 24 sets j=1, and C=0.

In the step S143, the movement trajectory calculation unit 24 acquires link(j). This means that the link(j) is selected as a link for the optimization process.

In the step S144, the movement trajectory calculation unit 24 determines whether the GPS measurement result (anchor point) corresponding to link(j) (link(1)) exists. When the determination of the step S144 is YES, the movement trajectory calculation unit 24 increments C by one (C←C+1, here C←1) and moves to the step S148. When the determination of the step S144 is NO, the movement trajectory calculation unit 24 does not increment C (remains C=0), and moves to the step S150.

In the step S148, the movement trajectory calculation unit 24 determines whether C is equal to N (C=N). The value N in this case is the number of links where an anchor point used for the optimization was acquired, which means the number of links, the links having respective correspondent anchor points. Here, a description will be given assuming that N is equal to three (N=3). When the determination of the step S148 is NO, the process moves to the step S150.

In the step S150, the movement trajectory calculation unit 24 increments j by one (j←j+1, here, j←2). Then, back to the step S143, the movement trajectory calculation unit 24 repeats the determination procedures of steps S144 through S150 till links corresponding to N (three) anchor points are acquired.

When the determination of the step S148 is YES, the process goes to the step S152. As described, when the process moves to the step S152, link(1) through link(3) illustrated in FIG. 14 are acquired as links for optimizing link(i) (here, link(1)).

In the next step S152, a subroutine of the optimization process is executed. More specifically, the process illustrated in FIG. 15 is executed. In the process of FIG. 15, the movement trajectory calculation unit 24 determines a default angle of each link in the step S160. In the step S160, default values of angles α, β and γ of N links (here, three links) are set randomly as represented in a pattern No. 1 in FIG. 16. Default values of angles are not limited thereto, and default values may be set by increasing each default value by 45° increments. For example, the default value of α may be set to 0°, the default value of β may be set to 45° and the default value of γ may be set to 90° as represented in a pattern No. 2. In addition, as represented in the pattern No. 3, default values may be set by increasing each default value by 90° increments. For example, the default value of α may be set to 0°, the default value of β may be set to 90° and the default value of γ may be set to 180°. Furthermore, default values may be set by increasing each default value by arbitrary increments.

In the step S162, the movement trajectory calculation unit 24 calculates a coordinate of a correspondence point. Here, the coordinate of the correspondence point means the coordinate of the position on the link (latitude, longitude) when the anchor point is acquired. That is to say that the coordinate of the correspondence point is the latitude and longitude of P(j) in FIG. 14. The coordinate of the correspondence point P(j) (lat(j), lon(j)) is calculated with following formulas (2) and (3).

$$\mathrm{lat}(j) = (\mathrm{walk\_}g(j) - \mathrm{walk\_}b(i-1)) \times w/\mathrm{link\_len}(i) \times \sin(\mathrm{link\_angle}(i)) + \mathrm{link\_}t\_y(j-1) \quad (2)$$

$$\mathrm{lon}(j) = (\mathrm{walk\_}g(j) - \mathrm{walk\_}b(i-1)) \times w/\mathrm{link\_len}(i) \times \cos(\mathrm{link\_angle}(i)) + \mathrm{link\_}t\_x(j-1) \quad (3)$$

Here, in above formulas (2) and (3), walk_g is the number of steps at the GPS acquisition timing in FIG. 9, walk_b is the number of steps in turning in FIG. 5B, w is a length of stride, link_len is a link length in FIG. 5B, link_angls is an angle of the link (in this case, a default value determined in the step S160), and link_t_x and link_t_y are the coordinate of the ending point of the link.

In the step S164, the movement trajectory calculation unit 24 calculates the sum of squares of distances between the GPS coordinates (anchor points) and the coordinates of the correspondence points. More specifically, it is calculated with the following formula (4).

$$\varepsilon = \sum_{j=1}^{N} (G(j) - P(j))^2 \quad (4)$$

The reason why the sum of squares of distances is calculated is based on a theory (Kamada and Kawai's model) which assumes that there is springs (spring constant k is constant) connecting points between points G(j) and points P(j) and estimates that the state where each spring is in a stable state, which means the state where the energy becomes minimum, is the best state In the step S166, the movement trajectory calculation unit 24 calculates $\alpha$, $\beta$ and $\gamma$ with which the sum of squares of distances becomes minimum by changing values of $\alpha$, $\beta$ and $\gamma$ and calculating the sum of squares of distances with changed $\alpha$, $\beta$ and $\gamma$. Then, the movement trajectory calculation unit 24 calculates the value of $\alpha$ as the angle of link(i). In FIG. 14, only the link (link(1)) of which the angle is optimized in the step S166 is illustrated with solid line. Then, the process moves to the step S154 in FIG. 13.

When the angle $\alpha$ is determined, the registration to the "link angle" in FIG. 5B becomes possible. The registration to "link starting point (x)", "link starting point (y)", "link ending point (x)" and "link ending point (y)" becomes also possible when the angle $\alpha$ is determined The coordinate of the link starting point (link_s_x(i), link_s_y(i)) and the coordinate of the link ending point (link_t_x(i), link_t_y(i)) are calculated with following formulas (5) through (8). The position of the anchor point which is acquired first in FIG. 7A may be used as the default value of the link starting point.

$$\mathrm{link\_}s\_x(i) = \mathrm{link\_}t\_x(i-1) \quad (5)$$

$$\mathrm{link\_}s\_y(i) = \mathrm{link\_}t\_y(i-1) \quad (6)$$

$$\mathrm{link\_}t\_x(i) = \mathrm{link\_len}(i) \times \cos(\mathrm{link\_angle}(i)) + \mathrm{link\_}s\_x(i) \quad (7)$$

$$\mathrm{link\_}t\_y(i) = \mathrm{link\_len}(i) \times \sin(\mathrm{link\_angle}(i)) + \mathrm{link\_}s\_y(i) \quad (8)$$

Figure 17A:
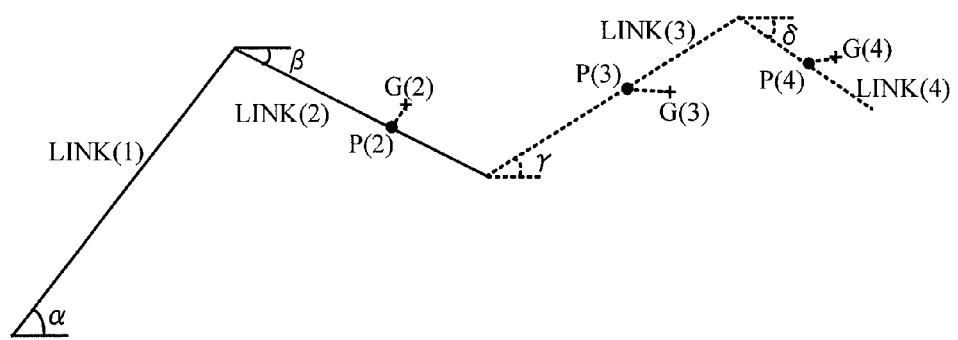
FIGS. 17A and 17B are diagrams illustrating the optimization process.
Figure 17B:
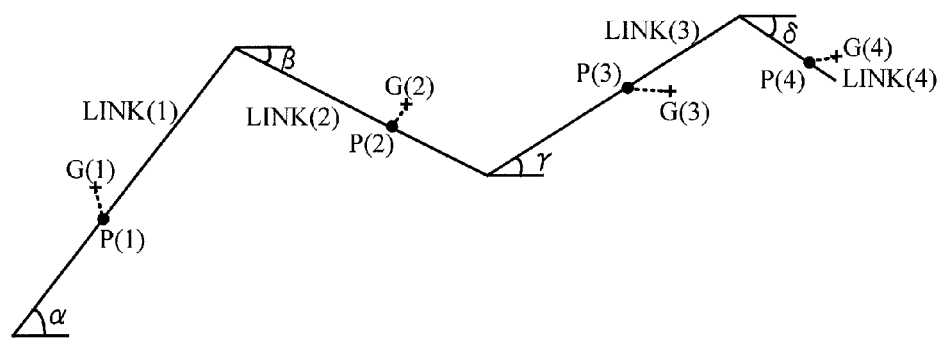

When the process moves to the step S154 in FIG. 13, the movement trajectory calculation unit 24 determines whether there is a link of which the angle is not determined yet. When the determination of the step S154 is YES, the movement trajectory calculation unit 24 moves to the step S156, increments i by one (i←i+1), and goes back to the step S140. Then, the movement trajectory calculation unit 24 repeats the procedures and determinations of steps S140 through S156 till angles of all links are determined. When the process in FIG. 13 is executed for the second time, the angle $\beta$ of link(2) is calculated by using link(2), link(3) and link(4) as illustrated in FIG. 17A. In this case, pattern Nos. 1 thorough No. 3 represented in FIG. 16 may be used as default value of angles $\beta$, $\gamma$ and $\delta$ of links in FIG. 15, or values of $\beta$ and $\gamma$ which were calculated in the previous optimization process (the process that optimized $\alpha$) may be used as default values as represented in a pattern No. 4. The angle of which the default value is newly set (angle $\delta$ in FIG. 17A and FIG. 16) may be set randomly or set in a same manner as the pattern No. 2 or No. 3. Then, when the determination of the step S154 becomes NO, all procedures in the step S20 is ended, and the process moves to the step S22 in FIG. 4. As described above, when the process moves to the step S22, values of angles $\alpha$, $\beta$, $\gamma$, $\delta$ and others illustrated in FIG. 17B are optimized.

Figure 18A:
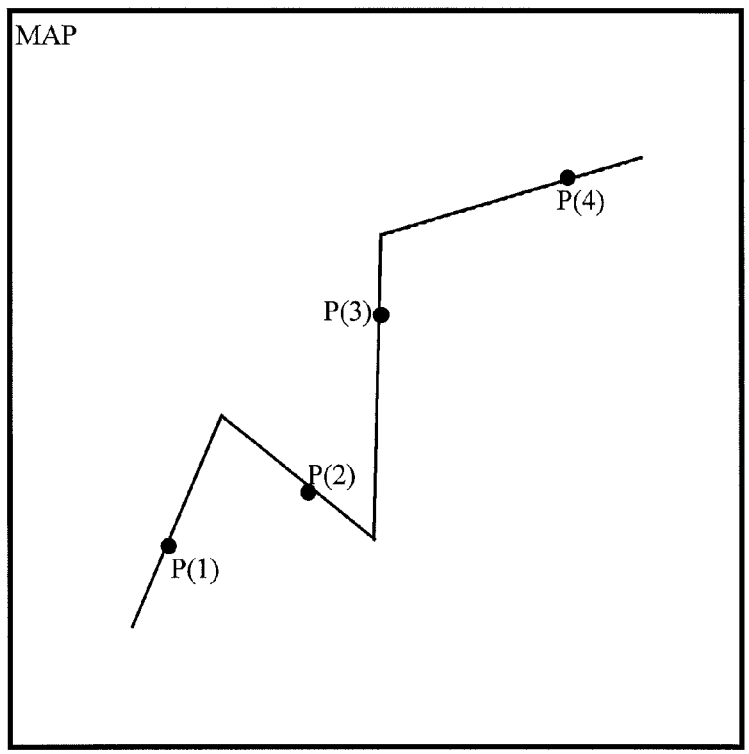
FIGS. 18A and 18B are diagrams for explaining a map matching process.
Figure 18B:
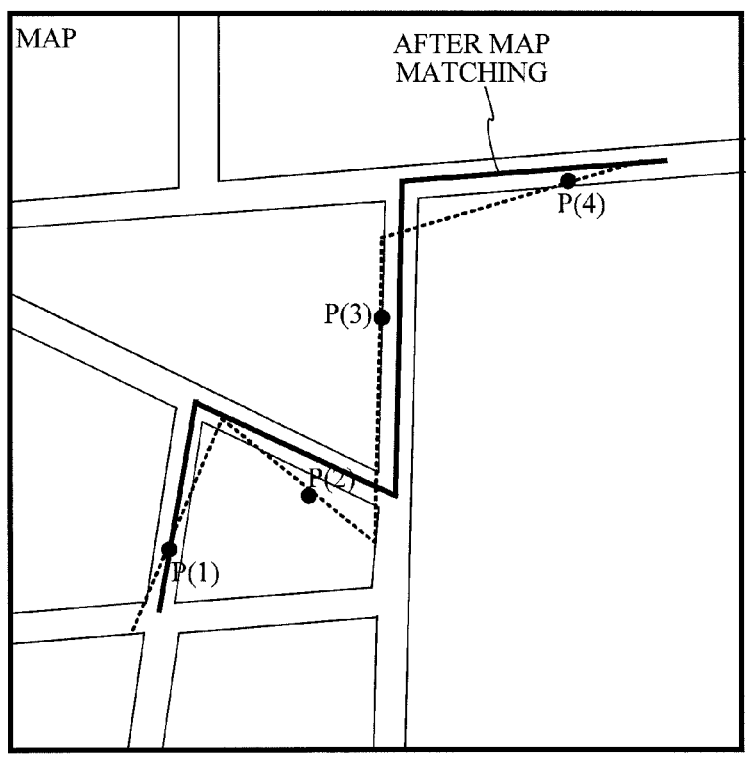

Back to FIG. 4, in the step S22, the movement trajectory calculation unit 24 calculates the movement trajectory. More specifically, the movement trajectory calculation unit 24 calculates the movement trajectory by connecting links with angles calculated in the step S20. Then, in the step S24, the movement trajectory calculation unit 24 executes a map matching process. More specifically, when the movement trajectory illustrated in FIG. 18A is calculated in the step S22 for example, the movement trajectory calculation unit 24 executes a map matching between the calculated movement trajectory and the map data stored in the information storage unit 23, and generates the traveled route on the map data as illustrated with bold line in FIG. 18B.

In the step S26 in FIG. 4, the display control unit 25 outputs the traveled route generated in the step S24 on the display screen 60.

As described above, the route where the user walked is displayed on the display screen 60.

Figure 19A:
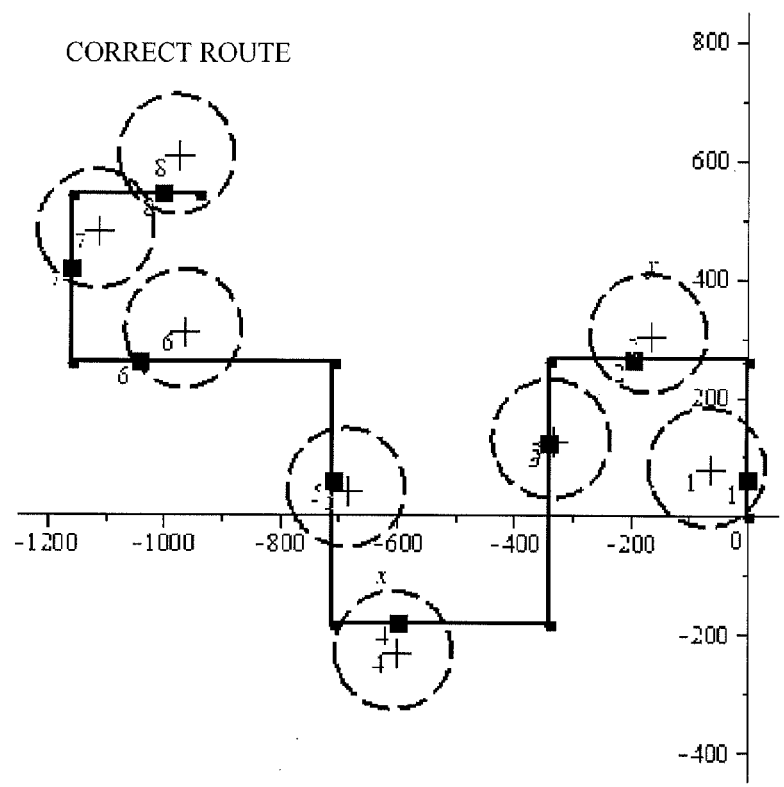
FIGS. 19A and 19B are diagrams for explaining a method of determining a value N.

A description will be given briefly of a method of determining the number of links (N) that anchor points correspond to, which is used for the optimization. FIG. 19A illustrates a relation (correct route) among links, anchor points G(i) (indicated by cross), positions where the anchor point was acquired on the link (indicated by square) when the user carrying the portable mobile terminal 100 in accordance with the present embodiment actually walked a certain route.

Figure 19B:
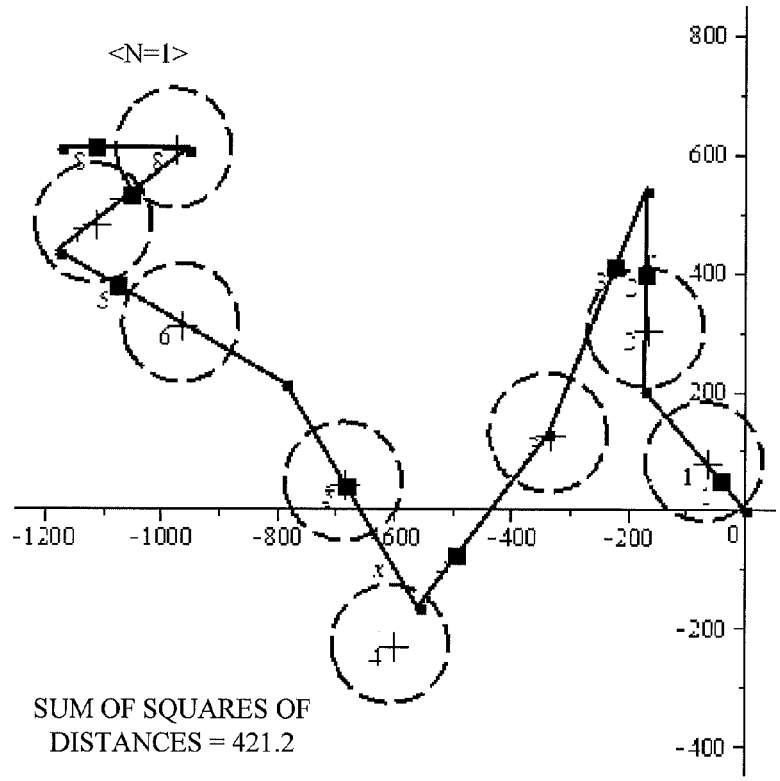

FIG. 19B illustrates a case where a method that calculates an optimized value of the angle of a link at N=1 is adopted. In FIG. 19B, the difference from the correct route is large. The sum of squares of distances between P(i) and G(i) in this case is 421.2, which is very large.

Figure 20A:
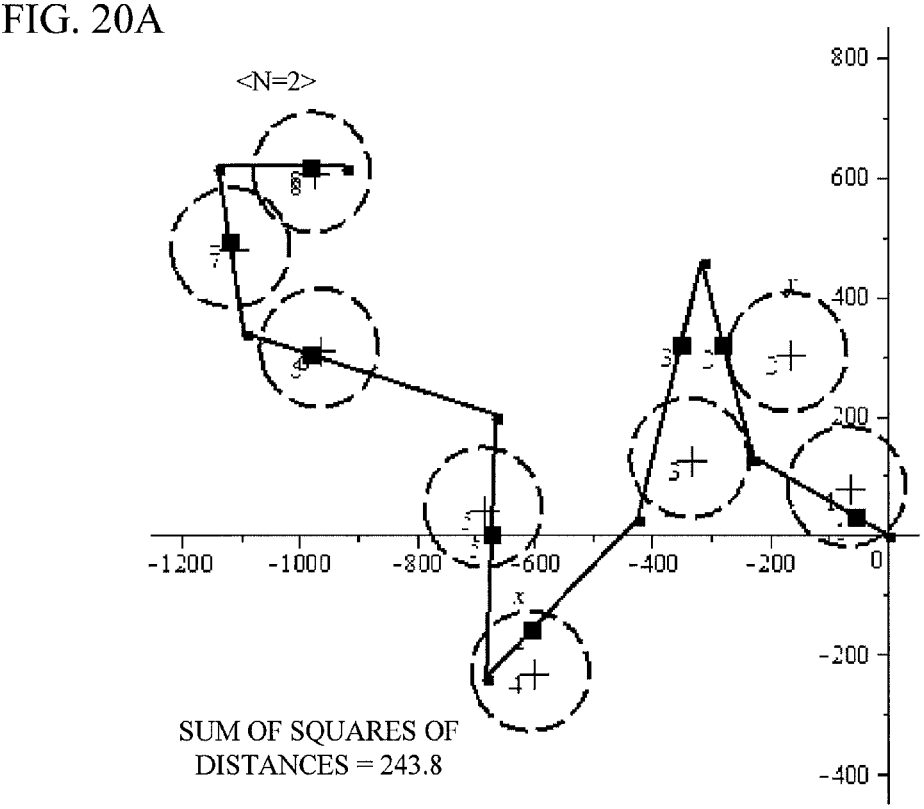
FIGS. 20A and 20B are diagrams for explaining the method of determining the value N.
Figure 20B:
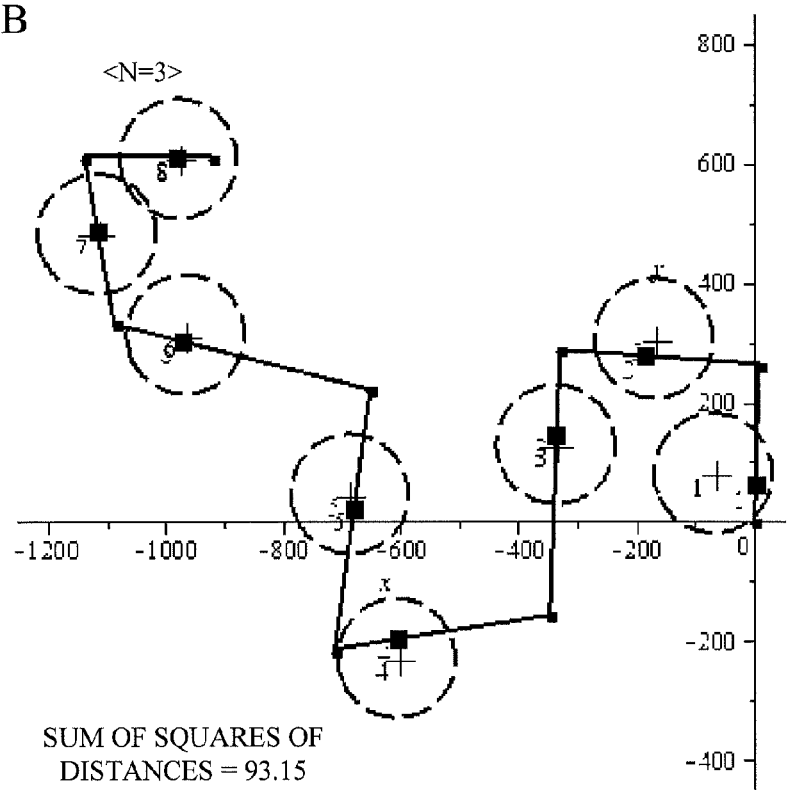

FIG. 20A illustrates a case where a method that calculates an optimized value of the angle of a link at N=2 is adopted. In FIG. 20A, the difference from the correct route becomes smaller than the case in FIG. 19B. The sum of squares of distances between P(i) and G(i) in FIG. 20A is 243.8. Moreover, FIG. 20B illustrates a case where a method that calculates an optimized value of the angle of a link at N=3 is adopted. In FIG. 20B, the difference from the correct route becomes smaller than the case in FIG. 20A. The sum of squares of distances between P(i) and G(i) in FIG. 20B is 93.15.

Figure 21A:
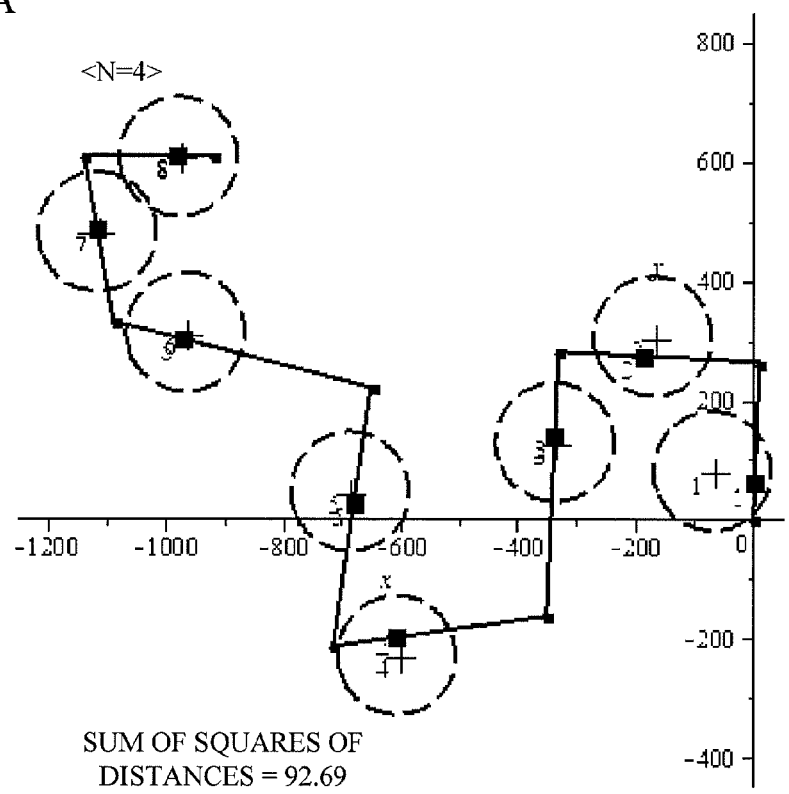
FIGS. 21A and 21B are diagrams for explaining the method of determining the value N.
Figure 21B:
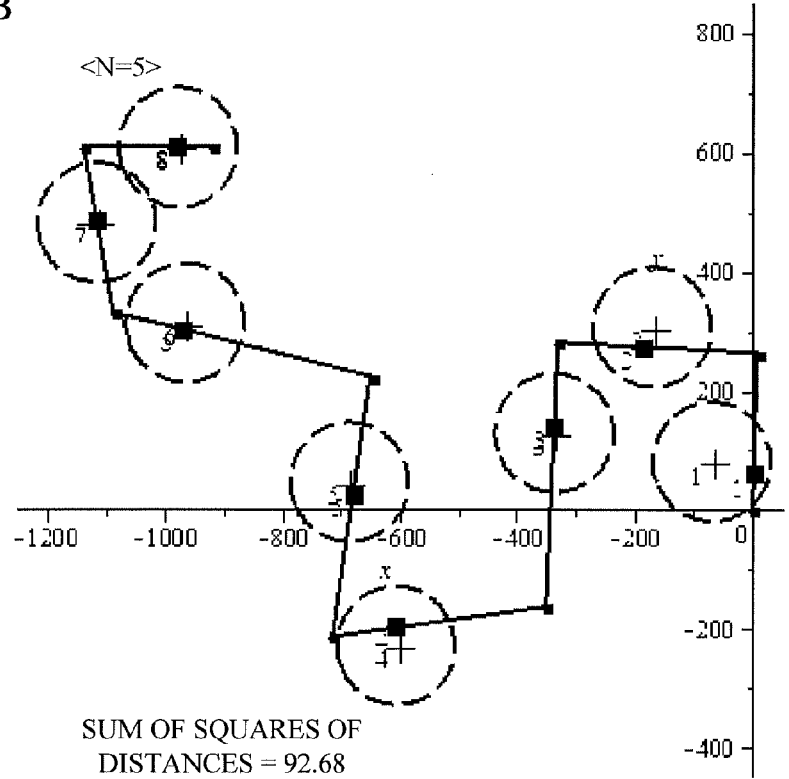

FIG. 21A illustrates a case where a method that calculates an optimized value of the angle of a link at N=4 is adopted. FIG. 21B illustrates a case where a method that calculates an optimized value of the angle of a link at N=5 is adopted. In FIG. 21A and FIG. 21B, the difference from the correct route is almost same as the case in FIG. 20B. The sum of squares of distances between P(i) and G(i) in FIGS. 21A and 21B is almost same as that in FIG. 20B.

That is to say that if the number of links having respective correspondent anchor points is more than three, almost same movement trajectory is calculated according to examples illustrated in FIG. 19A through FIG. 21B. As described above, N can be set by finding the value of N which does not make a big difference in the sum of squares of distances between P(i) and G(i) (the number of anchor points which makes the variance of the sum of squares smaller than given threshold value) with an experiment before shipment of terminals.

The timing for setting the value of N used for the optimization is not limited to a case before the shipment of terminals. For example, in each terminal, data illustrated in FIG. 18B through FIG. 21B may be acquired and the value of N may be updated. According to this, as the value of N may be changed in response to the environment and the like, it becomes possible to maintain the accuracy of the movement trajectory calculation.

As described above, according to the above embodiment, the movement trajectory calculation unit 24 calculates the movement trajectory based on the result of detection of the absolute position of the terminal body 10 by the absolute position detecting unit 30 and the result of generation of links indicating the length that the terminal body 10 traveled in a straight line by the link information generation unit 22. Then, the detection control unit 21, which determines a detection timing of the absolute position detecting unit 30, determines a timing which comes every given time as a tentative detection timing, determines the timing of when the link information generation unit 22 generates a new link next as the detection timing in a case where the link information generation unit 22 has not generated a new link (in a case where the turn is not detected), and carries out the detection of an absolute position with the absolute position detecting unit 30. According to this, when an absolute position is already detected while the terminal body 10 is traveling in a straight line, it becomes possible not to detect the absolute position again even though the intermittent detection timing comes. That is to say that in the above embodiment, the detection of the absolute position which hardly contributes the improvement of the accuracy of the movement trajectory calculation may be omitted. Accordingly, it becomes possible to maintain the accuracy of the movement trajectory and to reduce power consumption.

Moreover, in the above embodiment, when the link information generation unit 22 generates a new link (one-previous link in the above embodiment), in other words when the user carrying the terminal body 10 turns, the detection control unit 21 determines whether acquiring a new anchor point based on whether an anchor point was acquired in the one-previous link and whether an anchor point was acquired in the two-previous link Here, it is possible to determine whether it is necessary to acquire an anchor point to maintain the accuracy of the movement trajectory calculation by considering if anchor points in the one-previous and two-previous links were acquired. According to this, it becomes possible to maintain the accuracy of the movement trajectory calculation and to reduce power consumption with a simple determination.

In the above embodiment, the detection control unit 21 acquires an anchor point at the timing where the turn is detected when the absolute position detecting unit 30 did not acquire an anchor point in the two-previous link. According to this, it becomes possible to maintain the accuracy of the movement trajectory calculation. Furthermore, the detection control unit 21 acquires an anchor point again at the timing of when a given time passes after the last acquisition of the anchor point, for example at a timing after the user walked 30 m, when the absolute position detecting unit 30 did not acquire an anchor point in the one-previous link. According to this, as it becomes possible to prevent impossibility to distinguish which one of two symmetric trajectories is the part of the movement trajectory, it becomes possible to maintain the accuracy of the movement trajectory calculation from this point of view.

In the above embodiment, when the absolute position detecting unit 30 acquired an anchor point in the two-previous link, an anchor point may not be acquired at the timing of the detection of the turn. With this configuration, as it becomes possible to skip the acquisition of an anchor point when the accuracy of the movement trajectory calculation is not affected by the acquisition of the anchor point, it becomes possible to maintain the accuracy of the movement trajectory calculation and to reduce power consumption from this aspect.

In addition, in the above embodiment, as an anchor point is acquired at least one of timings just after the start-up of the absolute position detecting unit 30 and just after the shut-down of the absolute position detecting unit 30, it is possible to acquire absolute positions of a starting point and an ending point in the movement trajectory calculation. According to this, it becomes possible to improve the accuracy of the movement trajectory calculation. In addition, by detecting an absolute position again at a given interval after acquiring an anchor point just after the start-up of the absolute position detecting unit 30, it may be possible to distinguish the traveling direction of the mobile terminal early on after the detection of the absolute position is started.

In addition, in the above embodiment, the movement trajectory calculation unit 24 determines the angle of each link to the standard direction (e.g. east) and calculates the movement trajectory so that the sum of squares of distances between absolute positions G(i) detected by the absolute position detecting unit 30 and points P(i) on links where absolute positions are acquired becomes minimum. Accordingly, it is possible to calculate the movement trajectory appropriately by considering the energy between absolute positions and points on links (Kamada and Kawai's model).

Moreover, in the above embodiment, the movement trajectory calculation unit 24 determines the angle of the i-th acquired link to the standard direction (east) by using at least the i-th generated link in the link information generation unit 22 and (N−1) links that anchor points, which are consecutively acquired after the i-th link, correspond to. In this case, it becomes possible to reduce the calculation amount for the movement trajectory calculation by setting the value of N small without reducing the accuracy of the movement trajectory calculation more than necessary.

In addition, in the above embodiment, the value with which the minimum value of the sum of squares does not change more than a certain value even though the value is set larger is set as the value of N. Accordingly, it is possible to set the value of N to the value which does not reduce the accuracy of the movement trajectory calculation more than necessary.

In the above embodiment, a description was given of a case where the sum of squares of distances between G(i) and P(i)

is calculated with the formula (4), and the optimized value of the angle of a link is calculated from the minimum value of the sum of squares. However, the method of calculating the optimized value of the angle of the link is not limited thereto, and the angle of each link to make the energy of virtual springs between G(i) and P(i) minimum may be calculated as the optimized value by using Kamada and Kawai's model itself. In this case, the value calculated from the following formula (9) may be made minimum.

$$\varepsilon = \sum_{j=1}^{N} k(j)(G(j) - P(j))^2 \quad (9)$$

Figure 22A:
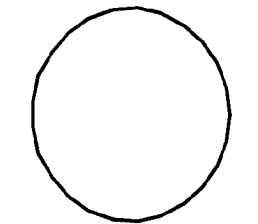
FIGS. 22A through 22F are diagrams for explaining a method of setting a coefficient k in accordance with a variant embodiment.
Figure 22B:
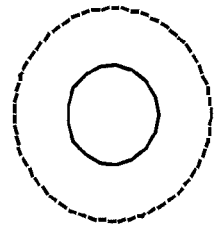
Figure 22C:
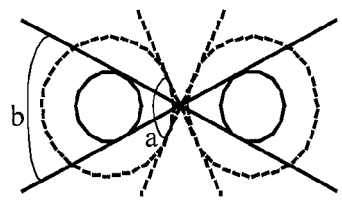
Figure 22D:
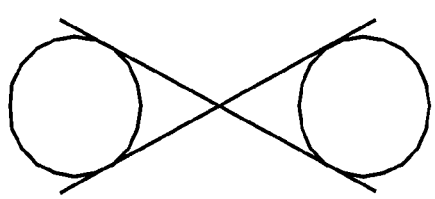
Figure 22E:
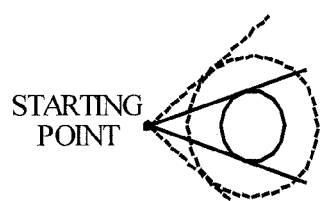
Figure 22F:
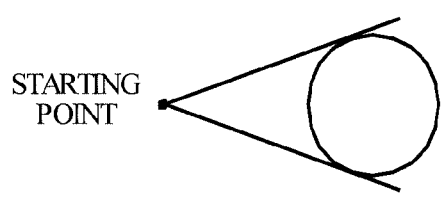

In the above formula (9), a coefficient of an energy formula (1/2) is omitted. In addition, the value of k(j) may be determined with a method described in FIG. 22A through FIG. 22F. As illustrated in FIG. 22A and FIG. 22B, when the liability of the detection by the absolute position detecting unit 30 when acquiring an anchor point is low, in other words when the number of GPS satellites in communication is small, k is set small, and when the liability is high, in other words when the number of GPS satellites in communication is large, k is set large. In FIG. 22, the size of the circle represents the magnitude of k. As illustrated in FIG. 22C, in a case where the distance between anchor points is short, as the angle indicating the difference between lines passing through two anchor points becomes large (angle a) as illustrated with dashed line if k is small, a circle is made small, which means that k is set large, so that the angle becomes small (angle b). On the other hand, as illustrated in FIG. 22D, when the distance between anchor points is long, a circle is made big, which means that k is set small. Furthermore, as illustrated in FIG. 22E, when the distance from the starting point to the anchor point is short, k is set large in the same manner as the case in FIG. 22C. As illustrated in FIG. 22F, when the distance from the starting point to an anchor point is long, k is set small in the same manner as the case in FIG. 22D.

This will allow the appropriate calculation of the movement trajectory with the liability and the distance between anchor points being considered.

In the above embodiment, the optimized value of the angle of link(i) is calculated with links from link(i) to link(j) including N links where anchor points are acquired. However, the optimized value of the angle of link(i) may be calculated by using N links from link(i) to link(i+N-1) for example. Moreover, the optimized value of the angle of link(i) may be calculated by using links corresponding to N anchor points.

Figure 23:
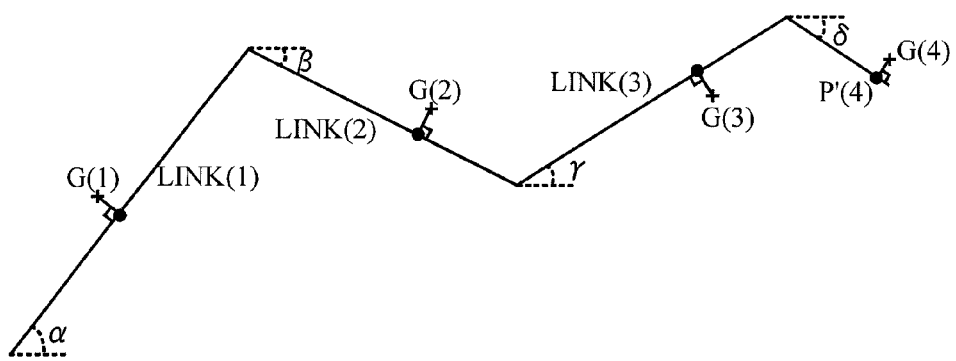
FIG. 23 is a diagram illustrating an optimization process in accordance with the variant embodiment.

In the above embodiment and variant embodiment, a description was given of a case where the movement trajectory is calculated with the sum of squares of distances between anchor points G(i) and P(i), P(i) corresponding to anchor points G(i). However, a method of calculating the movement trajectory is not limited to the above embodiment and variant embodiment. For example, as illustrated in FIG. 23, the angle of the link where the sum of squares of distances between anchor points G(i) and link(i) becomes a minimum value may be an optimized value.

In the above embodiment, a description was given of a case where the position in the GPS database is represented with the latitude and longitude, but the latitude and longitude may be represented by other values (e.g. distance from the starting point, the starting point being used as the origin). In this case, a positive direction in the x coordinate may be an east direction, and a positive direction in the y coordinate may be a north direction.

In the above embodiment, the description was given of a case where the movement trajectory is calculated in the portable mobile terminal 100, but the embodiment does not restrict any cases. For example, in the portable mobile terminal 100, the detection results of the absolute position detecting unit 30, the geomagnetic information detecting unit 40 and the acceleration information detecting unit 50 may be transmitted to an external server or the like. As the server has same functions as those of the controller 20 in FIG. 3, it may be possible to calculate the movement trajectory and a traveled route. In addition, the calculated movement trajectory and traveled route may be transmitted to the portable mobile terminal 100 from the server.

In the above embodiment, the description was given of a case where a GPS sensor is used as the absolute position detecting unit 30, but the absolute position detecting unit 30 is not limited to the above embodiment, and other devices may be used as the absolute position detecting unit 30. For example, an RFID system may be used as an absolute position detecting unit. Moreover, in the above embodiment, other orientation sensors such as gyro sensors may be used as the geomagnetic information detecting unit 40 instead of a geomagnetism sensor.

The process functions of the controller 20 in the above embodiment can be achieved by a computer. In that case, programs where the process of the function that the controller 20 has is written are provided. The process function described above can be implemented to the computer by executing programs by the computer. Programs where the process is written can be stored in the computer readable medium.

Programs are distributed in a transportable recording medium such as DVDs (Digital Versatile Disc) and CD-ROMs (Compact Disc Read Only Memory) in which programs are recorded. Programs can be stored in a storage device of a server computer, and be transferred to other computers from the server computer via a network.

The computer executing programs stores programs recoded in the transportable recoding medium or programs transferred from the server computer to its storage device. Then, the computer reads a program from its storage device, and executes the process according to the program. The computer can read a program from the transportable recording medium directly and executes the process according to the program. The computer can executes a process according to a program that the computer receives every time when the program is transferred from the server computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A portable mobile terminal comprising:
  a terminal body;
  an absolute position detecting unit configured to detect an absolute position of the terminal body by receiving signals from satellites;

a detection control unit configured to determine a detection timing causing the absolute position detecting unit to detect the absolute position;

a link information generation unit configured to acquire a line segment indicating a rectilinear travelling distance of the terminal body every time a travelling direction of the terminal body is changed; and a movement trajectory calculation unit configured to calculate a movement trajectory of the terminal body based on a detection result of the absolute position detecting unit and an acquisition result of the link information generation unit, wherein the detection timing determined by the detection control unit is a timing at which the link information generation unit acquires the line segment if the link information generation unit has not acquired the line segment between a previous one of the detection timing and a tentative detection timing that comes every given time.

2. The portable mobile terminal according to claim 1, wherein the detection control unit determines whether the absolute position detection unit detects an absolute position of the terminal body during a first duration and during a second duration in a case where the link information generation unit acquires a new line segment, and determines the detection timing based on a result of a determination, the first duration representing a duration of travel of the terminal body along a rectilinear travelling distance indicated by the new line segment, and the second duration representing a duration of travel of the terminal body along a rectilinear travelling distance indicated by a line segment that the link information generation unit acquired before the new line segment.

3. The portable mobile terminal according to claim 2, wherein the detection timing determined by the detection control unit is a timing of when the new line segment is acquired in a case where the absolute position detection unit has not detected the absolute position of the terminal body during the second duration.

4. The portable mobile terminal according to claim 3, wherein the detection timing determined by the detection control unit is also a timing having a given interval from a timing of when the new line segment has been acquired in a case where the absolute position detecting unit has not detected an absolute position of the terminal body during the first duration either.

5. The portable mobile terminal according to claim 2, wherein the detection timing determined by the detection control unit is not a timing of when the new segment is acquired in a case where it is determined that the absolute position detecting unit has not detected the absolute position of the terminal body during the second duration.

6. The portable mobile terminal according to claim 1, wherein the detection timing determined by the detection control unit is at least one of timings just after a start-up of the absolute position detecting unit and just after a shut down of the absolute position detecting unit.

7. The portable mobile terminal according to claim 6, wherein the detection timing determined by the detection control unit is also a timing having a given interval after the timing just after the start up in a case where the detection timing determined by the detection control unit is the timing just after the start-up of the absolute position detecting unit.

8. The portable mobile terminal according to claim 1, wherein the movement trajectory calculation unit calculates the movement trajectory by determining an angle of each line segment to a standard direction so that a sum of distances between line segments acquired by the link information generation unit and absolute positions detected by the absolute position detecting unit while the terminal body is traveling along the each line segment becomes a minimum value.

9. The portable mobile terminal according to claim 1, wherein the movement trajectory calculation unit calculates the movement trajectory by determining an angle of each line segment to a standard direction so that a sum of squares of distances between absolute positions detected by the absolute position detecting unit and points on the line segments where the absolute positions are acquired becomes a minimum value.

10. The portable mobile terminal according to claim 9, wherein the movement trajectory calculation unit calculates the movement trajectory by determining an angle of the each line segment to the standard direction so that a sum of values calculated by multiplying squares of distance between absolute positions detected by the absolute position detecting unit and points on the line segments where the absolute positions are acquired by a coefficient relating to the absolute position detecting unit at a time of when the absolute positions are acquired becomes a minimum value.

11. The portable mobile terminal according to claim 8, wherein the movement trajectory calculation unit determines an angle of i-th (i: integer) acquired line segment to a standard direction by using the i-th acquired line segment in the link information generation unit and a given number of line segments acquired consecutively from the i-th acquired line segment.

12. The portable mobile terminal according to claim 11, wherein the given number has a value with which the minimum value does not change more than a specified value even though the value is made larger.

13. A non-transitory computer readable medium storing a program causing a computer to execute a process, the process comprising:

detecting an absolute position of a terminal body by receiving signals from satellites;

determining a detection timing of the detecting;

acquiring a line segment indicating a rectilinear travelling distance of the terminal body every time a travelling direction of the terminal body is changed; and calculating a movement trajectory of the terminal body based on a detection result of the detecting and a result of the acquiring, wherein in the determining the detection timing is a timing at which the line segment is acquired if the line segment has not been acquired between a previous one of the detection timing and a tentative detection timing that comes every given time.

* * * * *